United States Patent
Larabie-Belanger

(10) Patent No.: US 10,552,181 B2
(45) Date of Patent: Feb. 4, 2020

(54) USER INTERFACE EXTENDER

(71) Applicant: Dropbox, Inc., San Francisco, CA (US)

(72) Inventor: Maxime Larabie-Belanger, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 16/249,614

(22) Filed: Jan. 16, 2019

(65) Prior Publication Data

US 2019/0146814 A1   May 16, 2019

Related U.S. Application Data

(63) Continuation of application No. 15/396,313, filed on Dec. 30, 2016, now Pat. No. 10,223,135.

(51) Int. Cl.
  *G06F 3/00*  (2006.01)
  *G06F 9/44*  (2018.01)
  (Continued)

(52) U.S. Cl.
  CPC .............. *G06F 9/451* (2018.02); *G06F 8/38* (2013.01); *G06F 9/542* (2013.01);
  (Continued)

(58) Field of Classification Search
  CPC ...................................................... G06F 9/541
  (Continued)

(56) References Cited

U.S. PATENT DOCUMENTS

| 8,059,137 B2 | 11/2011 | Hanggie et al. |
| 8,843,853 B1 | 9/2014 | Smoak et al. |
| (Continued) | | |

FOREIGN PATENT DOCUMENTS

| JP | H09-101881 A | 4/1997 |
| JP | 2003-330715 A | 11/2003 |
| (Continued) | | |

OTHER PUBLICATIONS

"Actual Window Manager 8.9.1," Actual Tools, Copyright 2002-2016, [Online] [Retrieved on Sep. 16, 2016] Retrieved from the Internet<URL:http://www.actualtools.com/windowmanager/features/title_buttons/>.

(Continued)

*Primary Examiner* — Timothy A Mudrick
(74) *Attorney, Agent, or Firm* — Fenwick & West LLP

(57) ABSTRACT

Described embodiments enable generation of user interface (UI) extensions to a UI of a separate application. For example, a method may include receiving system notifications from the operating system indicating UI events associated with a UI state of the operating system. Responsive to a system notification for a target UI object or application, the method includes generating or updating a UI sub-state for the target application including target UI objects based on graphical properties of the target UI object as defined in the system notification. The method further includes generating a UI extension for a target UI object of the target application based on the graphical properties of the target UI object in the updated UI sub-state. The UI extension can be an overlay controlled by a separate process from the target application, and thus can be arbitrarily attached to the UI of the target application.

19 Claims, 15 Drawing Sheets

(51) Int. Cl.
  *G06F 9/46* (2006.01)
  *G06F 13/00* (2006.01)
  *G06F 9/451* (2018.01)
  *G06F 8/38* (2018.01)
  *G06F 9/54* (2006.01)
  *G06F 9/455* (2018.01)

(52) U.S. Cl.
  CPC ............ *G06F 9/45512* (2013.01); *G06F 9/54* (2013.01); *G06F 2209/545* (2013.01)

(58) Field of Classification Search
  USPC .......................................................... 719/318
  See application file for complete search history.

(56) References Cited

U.S. PATENT DOCUMENTS

| | | | |
|---|---|---|---|
| 9,142,193 | B2 | 9/2015 | Laubach |
| 9,319,508 | B2 | 4/2016 | Zhao |
| 2004/0207658 | A1 | 10/2004 | Awada et al. |
| 2005/0151750 | A1 | 7/2005 | Marion et al. |
| 2010/0064208 | A1 | 3/2010 | Valtchev |
| 2011/0185313 | A1 | 7/2011 | Harpaz et al. |
| 2013/0074010 | A1 | 3/2013 | Zhao |
| 2016/0092083 | A1 | 3/2016 | Korkus et al. |
| 2016/0259508 | A1 | 9/2016 | Eccleston et al. |

FOREIGN PATENT DOCUMENTS

| | | |
|---|---|---|
| JP | 2005-196476 A | 7/2005 |
| JP | 2007-241661 A | 9/2007 |
| JP | 2011-159325 A | 8/2011 |
| JP | 2015-027081 A | 2/2015 |

OTHER PUBLICATIONS

"Chameleon Window Manager," Evgeni Shmakov, Copyright 2002-2016, Early versions available at least Dec. 25, 2011, 2 pages, [Online] [Retrieved on Sep. 16, 2016] Retrieved from the Internet<URL:http://www.chameleon-managers.com/window-manager/>.

Lieberman, H., "Integrating User Interface Agents with Conventional Applications," Association for Computing Machinery, 1998 International Conference on Intelligence User Interfaces, IUI '98, Annual International Conference on Intelligent User Interfaces, pp. 39-46.

PCT International Search Report and Written Opinion, PCT Application No. PCT/IB2017/058088, dated Mar. 27, 2018, 12 pages.

First Examination Report for Australian Application No. 2019201854 dated Sep. 6, 2019, 3 pages.

USER INTERFACE EXTENDER

CROSS REFERENCE TO RELATED APPLICATIONS

This application is a continuation of U.S. application Ser. No. 15/396,313, filed Dec. 30, 2016, now U.S. Pat. No. 10,223,135, which is incorporated by reference in its entirety.

BACKGROUND

This disclosure generally relates to generating user interfaces (UI) of computer applications, and particularly to extending user interfaces for target applications executing on an operating system with additional user interface control elements to provide additional functionality to the target application.

Computer operating systems manage user interfaces and associated event handling for applications executing on the operating systems. Typically, the design of the user interface and the native functionality of a computer application (or the operating system) are determined by the application developer. The developer may (or may not) allow other programs to modify the user interface of the application, but at best in only specific and limited ways. For example, operating systems and applications may expose via an application programming interface (API) or via plug-in services, limited and specific ways to modify or add user interface objects, such as placing objects in particular menus, panes, or other predefined areas of the user interface. However, conventional operating systems and applications do not allow for third party applications to arbitrarily modify their user interfaces. In particular, conventional operating systems and applications do not enable a third party application to arbitrarily extend their user interfaces by attaching additional user interface objects to the user interface, where the additional user interface objects control additional functionality. As a result, this restricts the ability of third party application developers to offer features and functionality that enhances the underlying operating system or application.

SUMMARY

A user interface extender module can generate a UI extension for the UI of another application of interest, or target application. The UI extension comprises one or more UI objects with graphical properties that are in coordination with the graphical properties of the UI objects of the target application. For example, the UI object of a UI extension can be sized and located with respect to the UI objects of the target application such that the UI extension visually appears to be attached to the UI of the target application. A UI extension can be associated with functionality (e.g., executable functions or methods) that extends features and capabilities beyond those native to the target application.

The graphical properties of the UI extension are not constrained by the target application or operating system. Thus, the UI extension can be arbitrarily attached to any part of the UI of the target application as determined by the provider of the UI extension, not just to whichever parts of the target application is allowed by the target application developer. In one embodiment, a UI extension can be an overlay object that is displayed in front of a selected portion of the target application UI. As the UI of the target application is moved or resized, the UI extension is synchronously updated so that it appears to move with the UI of the target application, for example, maintaining a same relative position with respect to the target application's window. Alternatively, as the UI of the target application is moved or resized, the UI extension can be hidden and then redisplayed when the change to the target application is complete, providing smooth integration with the target application. Thus, the UI extension can provide an improvement in the functionality of the target application beyond its original capabilities.

In one embodiment, the UI extender module can monitor UI events generated by an operating system for the target application, and provide a UI extension for the UI of the target application that is responsive to the UI events. Advantageously, even if the operating system does not support explicit API-based access to the entire UI state of the executing applications, the UI extender module can maintain its own representation of the state of the UI of the target application. Using the state information, the UI extender can build UI extensions that are in coordination with changes of the UI state for target UI objects of the target application. The UI extender module can update a UI sub-state for the target application based on UI events detected by the operating system, and generate the UI extension based on the graphical properties of the UI objects of the UI sub-state.

The figures depict various embodiments for purposes of illustration only. One skilled in the art will readily recognize from the following discussion that alternative embodiments of the structures and methods illustrated herein can be employed without departing from the principles described herein.

DETAILED DESCRIPTION

Figure 1:
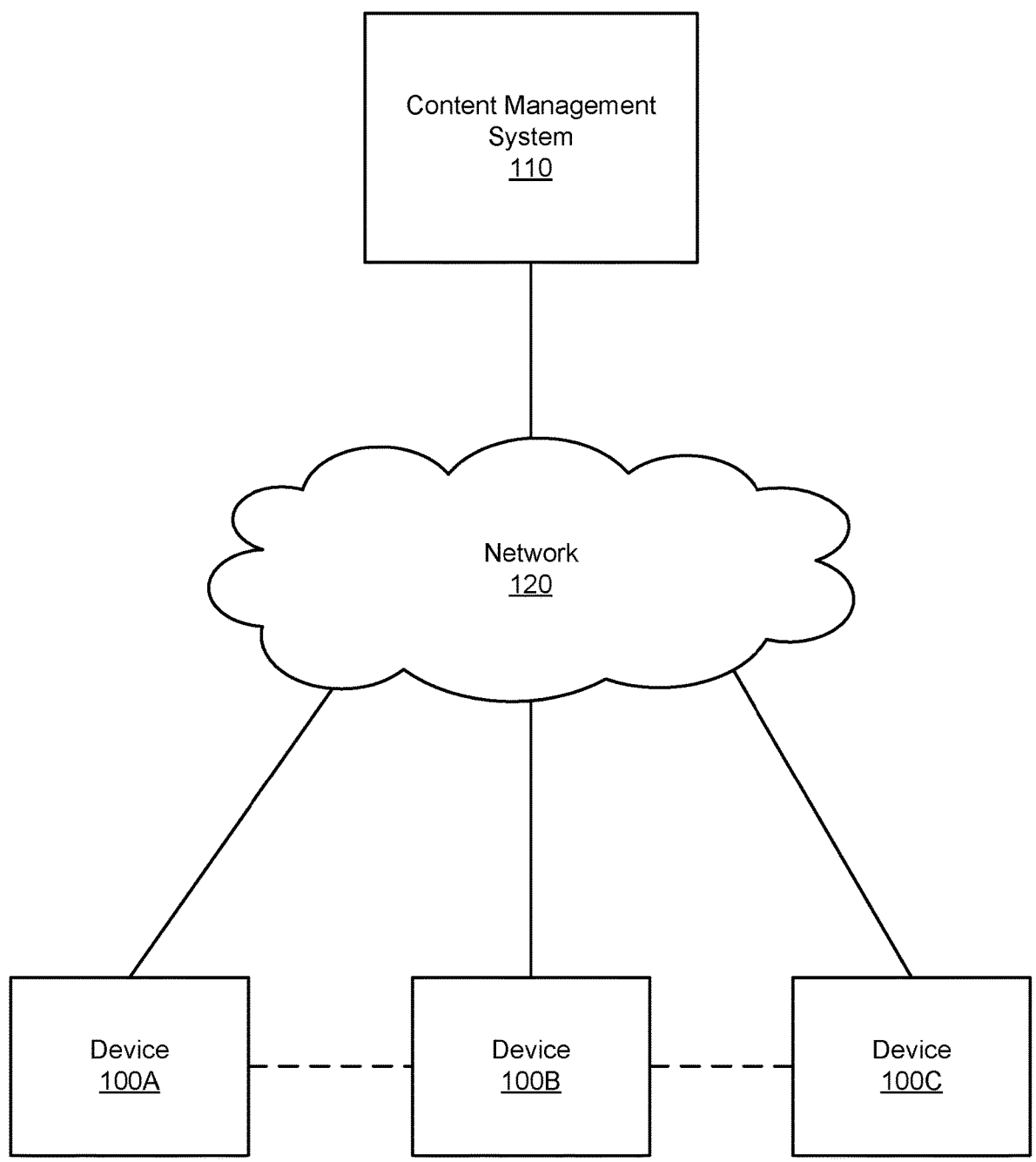
FIG. 1 shows an example of a system environment for providing user interface extensions to target applications.

FIG. 1 shows an example of a system environment for providing user interface extensions to target applications.

FIG. 1 includes devices 100A, 100B, 100C (referred to generally as device 100), a central (or content management) system 110, and network 120. Three devices 100 are shown only for purpose of illustration; in practice any number of devices can be present in the environment. Similarly, other modules or components described and illustrated throughout may include single or multiple instances, and can be combined or separated, as appropriate to the needs of the implementer and without loss of generality. In this illustrated embodiment, the user interface extension can be configured to facilitate content management system functionality such as, content item synchronization between the devices 100 and content management system 110, content item sharing, providing presence and seen state information, etc. In other embodiments, other functionality for the UI extensions unrelated to content management system functionality can be provided.

Device 100 is a computing device with a UI extender module (as will be described below). Using the UI extender module, device 100 can generate and provide UI extensions to target applications. As discussed in greater detail herein, a UI extension is generated based on the state of the target application UI, and in a manner that is in coordination with the graphical properties of the UI objects of the target application UI. Such UI extensions provide additional functionality to the target application beyond its original or natively programmed functions. For example, in the illustrated embodiments herein, the UI extensions can provide functionality to facilitate the local storing and viewing of content items and synchronizing the content items with content management system 110. The operation of device 100 to provide UI extensions for target applications in various embodiments is further described below.

Each device 100 communicates with content management system 110 through network 120. Network 120 is any suitable network and may include local networks, corporate networks, wide area networks, global networks, and any combination of these. In some configurations, devices 100 communicate via a wired or wireless communication network to a local network service provider, and communicate with content management system 110 through the Internet. In certain configurations, devices 100A, 100B, and 100C communicate directly with one another without network 120 as indicated in FIG. 1 by dashed lines. For example, devices 100 may communicate via a wired or wireless connection, such as wirelessly via a Bluetooth connection, local area network, or a wired connection via a Universal Serial Bus (USB).

Content management system 110 can provide content sharing and synchronization services for users of devices 100. These services allow users to share content with users of other devices 100. In addition to content sharing, content management system 110 can update shared content responsive to changes and enable synchronized changes to content items across multiple devices 100. A user may synchronize content across multiple devices 100 owned by the user and associated with the user's account, and the user may share content that is synchronized with devices associated with other users' accounts. Content stored by content management system 110 can include any type of data, such as digital data, documents, media (e.g., images, photos, videos, audio, streaming content), data files and databases, source and object code, recordings, and any other type of data or file, collectively referred to here as content items. Content items stored by content management system 110 may also be used to organize other content items, such as folders, tables, collections, albums, playlists, or in other database structures (e.g., object oriented, key/value, etc.). In practice, various devices 100 can synchronize different groups of content items based on user associations, permissions, content sharing permissions, and so forth. Content items can be presented through application UIs and UI extensions to facilitate content management and user interaction. However, the techniques discussed herein with respect to UI extension are not limited to UI extensions that facilitate interactions with content management systems or synchronized content items.

Figure 2:
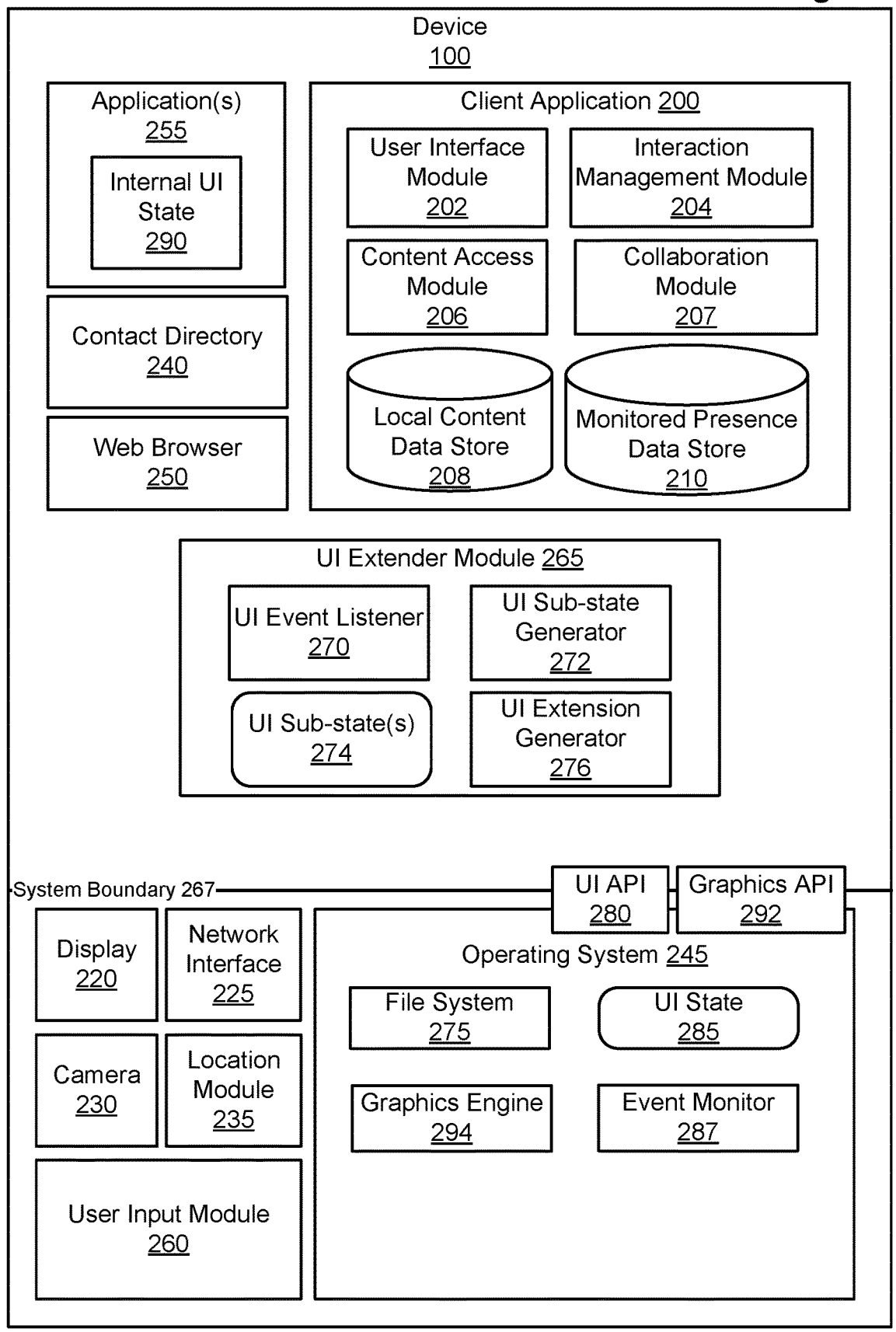
FIG. 2 shows various modules and components of a device.

FIG. 2 shows various modules and components of device 100 as configured with a UI extender module 265. Device 100 includes display 220 for providing information to the user, and in certain client devices 100 includes a touchscreen. Device 100 also includes network interface 225 for communicating with content management system 110 via network 120. Device 100 also includes a user input module 260, which receives user inputs from various user input devices, such as a keyboard, a mouse, a trackpad, a touchscreen, or other device. Various other components of the client device 100 are not shown to avoid overcomplicating the disclosure, for example, one or more computer processors, local fixed memory (RAM and ROM), as well as optionally removable memory (e.g., SD-card), power sources, and audio-video outputs.

The device 100 includes operating system 245, one or more applications 255, and client application 200. Applications 255 may include native applications that vary based on the client device. A subset of the applications 255 will be target applications for which the UI extender module 265 can provide UI extensions. In various implementations, the UI extender module can designate different applications 255 as target applications. In some implementations, a user of device 100 can control which of applications 255 are designated as the target applications.

Applications 255 may include various applications for handling (e.g., creating, viewing, consuming, and modifying) content stored on content management system 110, such as word processors, spreadsheets, database management systems, code editors, image and video editors, e-book readers, audio and video players, file managers, and the like.

Operating system 245 on the device 100 provides a local file system 275 and executes the various software modules such as the client application 200 and the native applications 255. Device 100 can include a contact directory 240 that stores information about the user's contacts, such as name, picture, telephone numbers, company, email addresses, physical address, website URLs, and the like. Further operation of native applications 255, operating system 245, and client application 200 are described below.

The device 100 may include additional components such as camera 230 and location module 235. Camera 230 is used to capture images or video for upload to the online content management system 110. Location module 235 determines the location of device 100, using for example a global positioning satellite signal, cellular tower triangulation, or other methods. Location module 235 is used by client application 200 to obtain location data and add the location data to metadata about a content item, such as an image captured by camera 230.

In various implementations, client device 100 can access content management system 110 in a variety of ways. Client application 200 can be a dedicated application or module that provides access to the services of content management system 110, providing both user access to shared files through a user interface, as well as programmatic access for other applications. Client device 100 may also access content management system 110 through web browser 250. As an alternative, client application 200 may integrate access to content management system 110 with the local file system 275 provided by operating system 245. For example, the operating system 245 can be configured to execute a file system browser application (e.g., a native application 255) to provide a UI for interaction with the content items of the file system 275.

The UI extender module 265 can generate a UI extension for one or more of the applications 255, and is one means for performing this function. The UI extender module 265 can be a standalone application or can be included as part of the client application 200. In some embodiments, the extended functionality includes programmatic functions that access the content management and synchronization services provided by the content management system 110. When access to content management system 110 is integrated in the local file system 275, a file organization scheme maintained at content management system 110 can be represented as a local file structure by operating system 245 in conjunction with client application 200. The local file structure may define file system paths for content items.

Client application 200 may take various forms, such as a stand-alone application, an application plug-in, or a browser extension. Client application 200 includes user interface module 202, interaction management module 204, content access module 206, local content data store 208, monitored presence data store 210, collaboration module 207, and UI extender module 265. In some embodiments, the UI extender module 265 is a separate application from the client application 200.

In addition to handling other device tasks, the operating system 245 can display information from applications 255 through respective user interfaces of the application. The user interface for an application 255 includes one or more UI objects or elements. Each UI object is defined by a set of properties. The properties can include graphical properties that define the dimensions and location of the UI object, such as height, width (e.g., X-Y coordinate pairs), or location on the display 220. Other graphical properties may include properties that define shape, color, opacity, texture, text attributes or any other visually perceptible characteristic. Each UI object further includes a UI object ID property, which uniquely identifies the UI object. In some embodiments, the UI object ID includes a global unique identifier (GUID) provided by the operating system. The GUID is shared across the operating system and one or more applications 255 to uniquely identify each UI object. The properties may further include handles or identifiers for program functionality associated with the object, such as method names, functions, or other programmatic interfaces.

In some embodiments, UI objects may further include an object type property defining the type or class of the UI object. Some example UI object types may include a window object, button object, file selector object, list view object, menu object, etc. In some embodiments, UI objects or object types may further include type-specific properties that define the behavior or other characteristics of the UI object type. UI object properties may further include other properties that are not graphically exposed, such as version or other status properties.

UI objects within a user interface of an application may include parent-child object properties that define hierarchies of UI objects within a UI state. For example, when a file object is located in a folder object, the file object can be defined as the child of the parent folder objects. These parent-child properties are defined using the object IDs for the related objects. A UI that includes both the file object and folder object is presented in accordance with the parent-child relationship, such as by displaying the file object within the dimensions of the folder object to represent the folder containing the file. As described in greater detail herein, other examples of parent-child UI object relationships may include menu-button, window-menu, application-window, etc.

UI objects may vary based on the particular device and configuration. UI objects may include windows on a desktop interface as well as interface elements on a mobile device. In that sense, UI objects can be of different UI object types or classes, which are defined by a UI object type property. Each UI object type may also include additional type-specific properties. For example, a UI object representing a particular file may include a file system path property that identifies the file within the file system 275. Examples of operating systems that employ UI objects such as windows are Microsoft Windows® 10 and OS X®.

The UI objects and their relationships are represented using various techniques or data structures. Generally, the operating system 245 generates and manages system-level UI state 285. The UI state 285 is a master UI state of the operating system and includes all UI objects managed by the operating system across all applications executing on the operating system 245. The UI state 285, as well as other lower level functionality, such as control of the display 220, network interface 225, camera 230, and location module 235 is said to be below the system boundary 267 that separate user application space from the operating system space. Because the operating system 245 needs to preserve the integrity and security of the UI state 285 for the executing applications, aspects of the UI state 285 may not be directly accessible by applications 255, the client application 200 or the UI extender module 265. Accordingly, the operating system 245 provides access to only certain data regarding the UI state 285 through UI API 280.

The operating system 245 includes an event monitor 287. The event monitor 287 can send system notifications regarding certain UI events to any application that has registered for such notifications. A UI event (referred to herein as an event) can indicate a change in a master UI state for application UIs maintained by the operating system. Some examples of UI events may include the opening/closing of window objects, a change to the currently focused object, selection of a button object, selection of a file object listed within a folder object, movement or resizing of a window object, etc. The operating system and UI extender module can communicate with each other regarding UI events using a UI API (e.g., the Accessibility API of the OS X® operating system by Apple Inc. of Cupertino, Calif., or the Windows Shell API of the Microsoft Windows® 10 operating system by Microsoft Corporation of Redmond, Wash.).

For example, when user input causes a change in a graphical property of a UI object of a target application, the UI state for that application in UI state 285 is updated accordingly by the operating system. In response to detecting a change in the UI state, the event monitor 287 can send a system notification indicating the event to registered listeners. Some example UI events that the UI extender module 265 may receive include creation/deletion of a UI object, a change in UI object focus or selection, a change in UI object graphical properties (e.g., window dimension, shape, location, etc.), or some other change in UI object properties.

The UI extender module 265 is configured with information specifying the target applications and/or target UI objects, and registers with the event monitor 287 for system notifications or callbacks regarding UI events associated with the target applications and/or target UI objects. For example, the UI extender may register for events for the web browser 250, a word processing application, a spreadsheet application, but not register for events for the contact directory 240, camera 230, or location module 235. The system notifications regarding an event occurring in a target application can be asynchronous notifications, in that continued execution of the underlying target application does not depend on receipt of the notifications by the UI extender module 265. Subsequent to registration, the UI event listener 270 of the UI extender module 245 can listen for the system notifications.

In various implementations, the UI sub-state generator 272 can generate and maintain a UI sub-state 274 for each target application or can generate and maintain a single UI sub-state 274 with elements from all the target applications, based on the system notifications, and is one means for performing this function. The UI sub-states 274 maintained by the UI sub-state generator 272 are thus separate from the UI state 285 managed by the operating system 245. The UI extender module 265 uses the UI sub-states to track the changes of the master UI state 295 for target objects based on UI events. The UI extender module 265 obtains the specific sub-state information for a target application or target object by calls to the UI API 280 and/or the graphics API 292 that register the UI extender module 265 to receive callbacks regarding UI events.

The UI sub-state 274 for a target application includes one or more target UI objects. The target UI objects of a UI sub-state 274 represent a subset of the UI objects of the master operating system UI state 285. The UI sub-state 274 may include only certain target UI objects of the target application, rather than all of the target application's UI objects. For example, the target UI objects may include a specific window or pane, and particular buttons or menus of the target application, but not include others. Thus, the user interface associated with a content management window may include folders or files, but only certain ones of the folders and files may be target objects representing content items managed by the content management system and others which are not target objects, representing folders and files that are not managed by the content management system. The target applications and target objects may be described as objects of interest to the UI extender module 265.

Advantageously, the UI sub-state generator 272 excludes from the UI sub-state 274 those UI objects that are not of interest to the UI extender module 265, retaining only a subset of all UI objects of the UI state 285 managed by the operating system 245. Handling only target UI objects at the UI sub-state 274 provides improvements to the functioning of the UI extender module 265 in terms of event processing efficiency and speed, and lowers memory allocation requirements.

Figure 5:
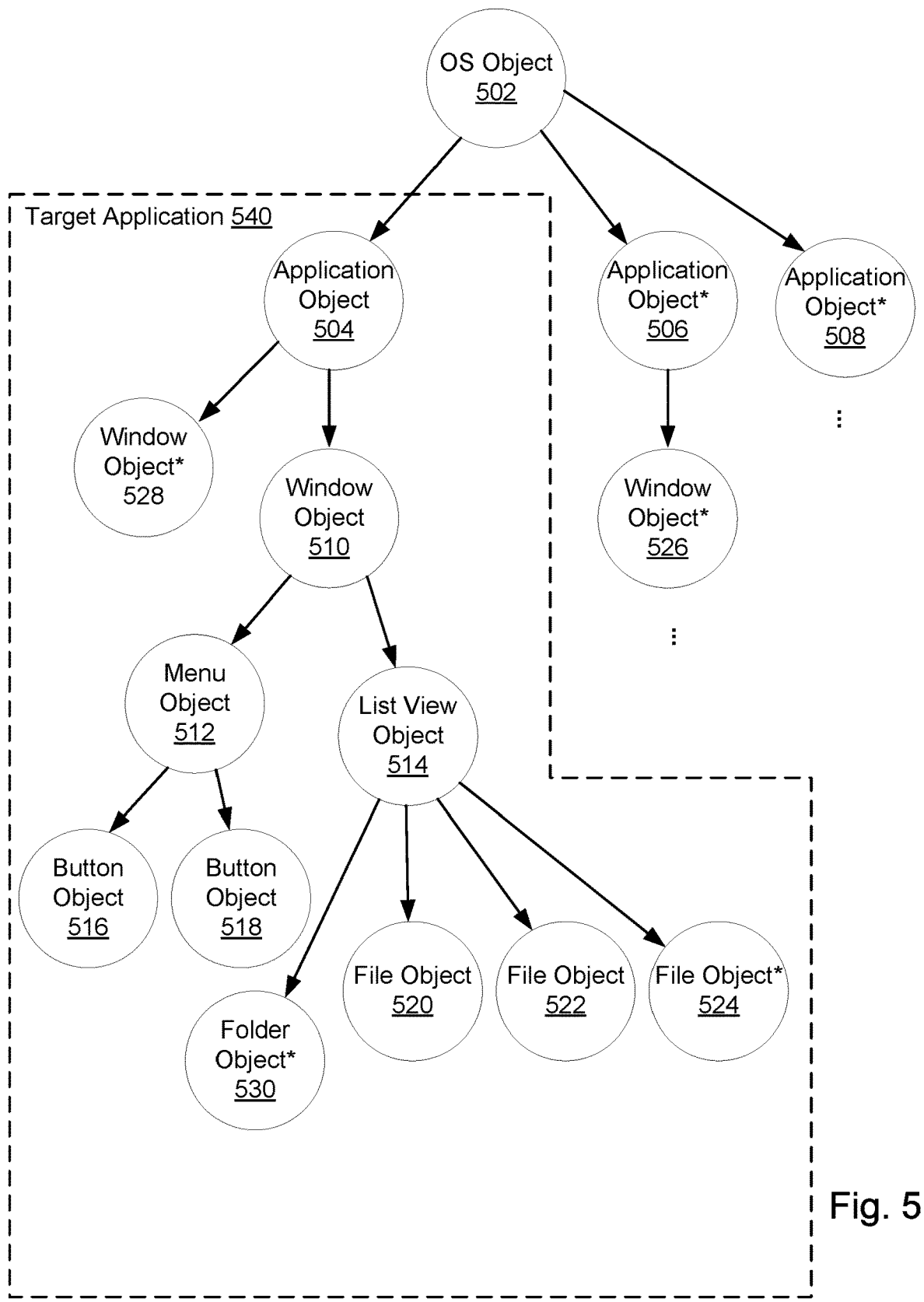
FIG. 5 shows an example of a UI state managed by an operating system.
Figure 8:
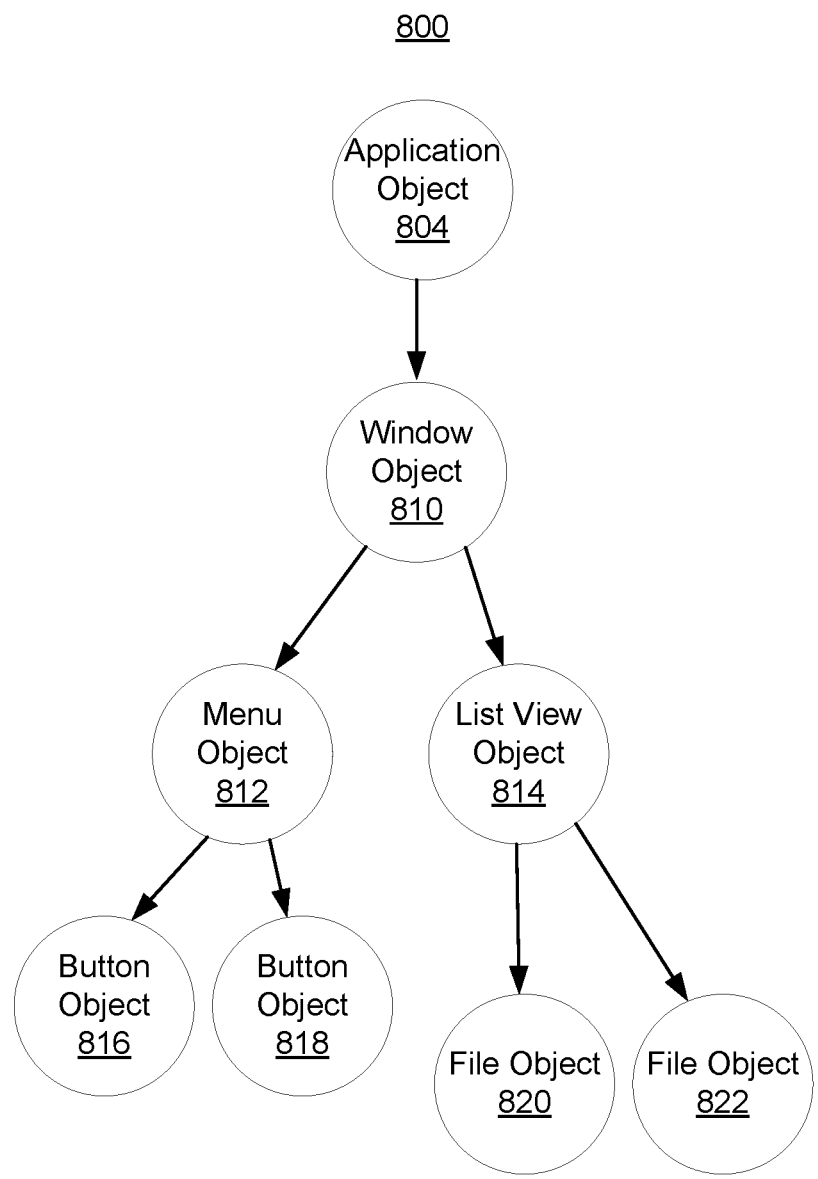
FIG. 8 shows an example of a UI sub-state of a target application.

The UI sub-state generator 272 can generate a separate UI sub-state 274 for each target application. In some embodiments, a predefined N number of UI sub-states 274 (e.g., the most recently focused) are kept within memory, and more stale UI sub-states 274 are released from memory. In some embodiments, UI sub-states 274 from multiple applications 255 may be combined into a single UI sub-state 274. For example, the N UI sub-states 274 may be connected to a root UI extender application node that is a parent node for each target application root node. An example of a UI-state 500 and an associated UI sub-state 800 are shown in FIGS. 5 and 8, respectively, and discussed in greater detail below.

The UI extension generator 276 accesses the UI sub-state 274 to generate UI extensions that are in coordination with the graphical properties of target UI objects, and is one means for performing this function. Thus, the UI extension generator 276 is not required to have direct access to the master UI state 285 maintained by the operating system 245. The UI sub-state generator 272 maintains the UI sub-state 274 based on receiving system notifications regarding UI events from the UI event manager 285 of the operating system 245, and the UI extension generator 276 references the UI sub-state 274 to generate or render the UI extension.

As noted above, the UI extender module 265 obtains the UI state information for target applications and objects using one or more of the operating system's APIs (or from the internal UI states 290 described below) that define limited classes of communication types or messages. These APIs include UI API 280 and graphics API 292. UI API 280 provides for messaging between the operating system 245 and the UI extender module 265 for UI events. Similarly, the graphics API 292 provides for messaging between the operating system 245 and the UI extender module 265 for graphics events. An example of a graphics API 292 includes the CoreGraphics API for OS X® provided by Apple, Inc. A graphics event refers to a rendering change in a graphics object by the graphics engine 294 of the operating system 245. In some embodiments, the UI extender module 265 may register and receive graphics events in addition to UI events when UI event notifications may be delayed to keep the UI sub-state 275 responsive to asynchronous changes in the UI state 285, as discussed in greater detail below in connection with FIG. 14.

Examples of UI APIs 280 include the Accessibility API for OS X® and the Windows Shell API for Microsoft Windows®. The UI API 280 provides predefined sets of routines and protocols that are used by the UI extender module 265 to register and receive system notifications for UI events from the operating system 245. The graphics API 292 provide predefined sets of routines and protocols that are used by the UI extender module 265 to register and receive system notifications for graphics events from the operating system 245.

The UI extension generator 276 can generate a UI extension for a target application based on properties of the target UI objects in the UI sub-state 274, and is one means for performing this function. The UI extension provides an interface for enhancements and additional capabilities for target applications. The UI extension may provide for extended functionality, such as extending an explorer or finder application for a local file system with extender UI objects that facilitate interaction with the content management system 110 and associated services.

The UI extension generator 276 can further display the UI extension with the target UI objects of the application UI. For example, the UI extension can be displayed in coordination with one or more target UI objects. When in coordination, the UI extension can operate like an integrated or attached object of the native application UI. For example, the UI extension may be a UI button object that resizes, scales, moves, and/or otherwise adapts to changes to the graphical properties of a target UI menu object. In another example, when a target UI menu object is moved, the UI extension may also be moved accordingly to preserve UI extension attachment to the native application UI. In yet another example, when a target UI object is moved, the UI extension may be hidden until the move is complete, at which point the UI extension can be re-displayed at a position relative to the moved target UI object. Advantageously, generating the UI extension, using the UI extender module 266, separately from the native application 255 means that the application 255 imposes no direct programmatic constraints on the nature (e.g., size, location, appearance, content, etc.) of the UI extension attachment. Thus the UI extension can be attached to the UI of the target application at arbitrary locations, rather than only in predetermined and fixed locations as may be allowed for by the target application itself. Accordingly, in one embodiment, rather than being directly integrated within the UI of the target application, the UI extension is provided as a graphical overlay to the target UI object.

Some applications 255 may maintain their own internal UI state 290. The internal UI state 290 of an application defines an internal model of UI objects and graphical properties of the UI objects for the application. An application 255 can provide other applications 255 with limited access to the internal UI state 290 (e.g., using an API). For these applications 255, in some implementations, the UI extender module 265 can communicate with the application 255 when the information from the system notifications regarding UI events needed to generate the UI extension is provided slowly, unavailable or incomplete. For example, the master UI state 285 may not include sufficient UI object types or classes to resolve the UI sub-state. The Windows® operating system, for example, uses only a window UI object type for windows, buttons, menus, folders, and files, leaving it to specific applications 255 within their own internal UI state 290 to maintain the specific type information. Accordingly, in these situations, the UI extender module 265 can perform a translation function between UI objects of the UI state 285 and target UI objects of the UI sub-state 274 based on data obtained from an application 255 for its internal UI state 290. The translation function identifies distinct UI object types for the UI sub-state 274, and identifies associated type-specific parameters such as the target application and file system path for a file or folder object type. The UI extender module 265 can match master UI objects to application UI objects based on determining a correspondence between object IDs, such as by using the translation function.

In some cases, a system notification of a UI event from the operating system 245 may fail to identify a content item (e.g., file, folder, etc.) represented by a UI object. For example, the Windows® operating system does not include a parameter that identifies an underlying content item in its window object class. As discussed in greater detail below in connection with FIG. 12, the UI extender module 265 can query an internal UI state 290 of a target application 255 to identify the UI object type, content item or other object properties, and may update the UI sub-state 275 to include results of the query.

System notifications of events from the operating system 245 may also be insufficient to keep the UI sub-state 274 updated in a timely manner, which could cause the UI extension to loose coordination with the underlying UI of the target application. For example, the UI event monitor 287 for the OS X® Accessibility API or Windows Shell API may encounter unacceptable messaging delays regarding the movement of a target application window. Accordingly, the UI extender module 265 can receive event notifications from other sources that are more current and that experience less messaging delays. For example, the operating system 245 typically includes a graphics engine 294, which renders the UI objects of the UI state 285. The UI objects rendered by the graphics engine 294 are graphics objects, and may include graphical properties similar to the UI object graphical properties. For example, a graphics object for a rendered window may include height, width, and location parameters such that the graphics engine can render the graphics object. Since graphics operations are given very high priority in order to ensure a responsive user interface, the current state of UI objects and events can be obtained from the graphics engine with minimal delay. Thus, as discussed in greater detail herein with reference to FIG. 14, the UI extender module 265 may communicate with the graphics engine 294 using a graphics API 292, such as using the CoreGraphics API for OS X® to receive system notifications regarding graphics events for some target UI objects. A graphics event, as used herein, refers to an event that changes the graphical properties of a graphics object, and thus results in a change in the rendering of the graphics object.

System notifications regarding graphics events may include the graphics object ID of the graphics object. The UI extender module 265 can map graphics object IDs to UI object IDs to determine the UI object for the graphics event. The UI extender module 265 can associate UI object IDs (or GUIDs) with graphics object IDs. The graphics engine 294 and graphics API 292 (e.g., CoreGraphics API) thus provides for faster event notification than the UI API 280 (e.g., the Accessibility or Windows Shell APIs). In that sense, notifications of asynchronous events that pertain to the UI sub-state 274 are provided from various processes of the operating system 245, and using the suitable API.

In addition, operating system 245 manages control of multiple native applications 255, which may be executing simultaneously. The UI objects across different applications 255 are then layered, such that one layer overlaps or overlays another layer on the display screen. In some operating systems and configurations, only the interface objects for a single application are displayed at a given time. One user interface object is typically the active or focused UI object, meaning that it is the user interface object to which the operating system 245 routes user inputs, such as keyboard entry, cursor movement, touch sensors, touch gestures, and so forth. A window or other UI object that is active at a particular time can be said to have focus. Users may select another UI object to change the focus from one user interface object to another, and in some instances operating system 245 may change the focus without user input.

Typically, the user interface object, e.g., windows, associated with native applications 255 are managed by operating system 245, which maintains an association between process identifiers of executing native applications 255 and UI object IDs of the UI objects. In some embodiments, UI object IDs may include GUIDs. The operating system 245 may also maintain content items and file system paths associated with process identifiers and/or GUIDs. For example, a particular application may be associated with process ID 2587, and managing multiple user interface objects, with user interface object identifiers 4, 8, and 10. Each UI object ID is separately associated with or represents a particular content item opened by that native application 255, and multiple UI object IDs and process identifiers can be associated with the same content item.

Operating system 245 also handles and recognizes various events, such as UI events or graphics events. UI events may include a request from native applications 255 to close or open a content item, a request from native applications 255 to close a window or other UI object, a request to change a graphical property of a UI object, and a request to change a UI object focus, among many others. As described below, the UI extender module 256 can use these UI events (and graphics events, in some embodiments) to generate UI extensions. Furthermore, these events can be used by interaction management module 204 to recognize a change in presence related to a content item.

Client application 200 can identify interactions that take place with respect to a content item, such as when a user opens, closes, edits, saves, or shares the content item on the device. These interactions can be identified by client application 200 to generate interaction information describing interactions with the content item. Interaction information includes interactions with client application 200 and interactions with native application 255. Interaction information determined from actions performed in relation to content items from within native applications 255 is termed presence information. An application, such as client application 200 that determines interaction information and presence information, is termed a presence application. Additional types of interaction information (in addition to presence information) include notes, messages, and notification requests related to the content item, which is received by client application 200. Messages may include chat messages to other devices, messages indicating a user's intent to interact with (e.g., to edit) a content item, and messages indicating a user's intent to begin a collaboration session. Notification requests may include a request to be notified when another user's interaction information changes. Interaction information also includes metadata modifications, such as versioning notes, event timestamps, or requests for further information stored at content management system 110 about the content item, such as a request to view versioning information or prior content item versions. Client application 200 may receive chat or intent information from a user. In various embodiments, device 100 identifies a user's presence in a content item (i.e., that the user has the content item open or is editing the content item using the native application 255) through interaction with operating system 245. Interaction information can be transmitted to other devices 100, e.g., through content management system 110, that are synchronized with respect to the content item.

Device 100 maintains content items synchronized with the content management system 110 and permits users to view, modify, and interact with the content items using various native applications 255 stored on the device 100. For example, device 100 may include a photo editing application that manipulates image content items, a word processing application that permits modification of text content items, or a computer-aided design (CAD) application that permits modification of drawing content items. Interaction information is determined by device 100 via applications 255 and the interaction information is sent to other devices 100. In addition, when device 100 receives interaction information relating to other devices 100, the device 100 displays that interaction information.

In one embodiment, an application detecting interaction information relating to content items can be distinct from the applications viewing or manipulating the content items. For example, the client application detecting interaction information can be distinct from a photo editing application manipulating or displaying the image content items. In various embodiments, the application detecting interaction information is also responsible for synchronizing the content items with content management system 110. Since the application detecting presence information can be distinct from the applications about which presence is detected, presence can be monitored for many applications and content items at once and without requiring integration of the presence monitoring into each type of content item viewer.

That is, no application-dependent presence monitoring add-on or application modification is required, for example, for each of a photo editing application, a word processing application, and a playlist editing application.

To open a content item, native application 255 requests the content item from operating system 245 and receives a handle to the content item from operating system 245 for the content item. In some cases, application 255 does not maintain the handle, and may load the content item data into memory and subsequently closes the content item handle even if native application 255 continues to use data from the content item or if the user enters edits to the content item. Accordingly, open content item handles are often not a reliable way to determine whether an application is interacting with a particular content item. As such, in certain embodiments, further behaviors exhibited by the native applications 255 are used to determine whether an application is editing a content item.

Native applications 255 also perform various behaviors when a user modifies a content item, and prior to the user saving the content item. These behaviors vary based on the application and operating system 245. For example, some native applications 255 create a temporary content item with a filename that differs from the open content item, for example leading the temporary content item's filename with a tilde or other recognizable mark. In other examples, the native application 255 changes the title of a user interface element associated with the content item, which may or may not be directly viewable by a user. In still further examples, native application 255 sets a flag indicating the content item has been modified. Native application 255 may also provide information regarding content item modification in response to a request from another application or the operating system. Since an open content item handle may not reliably determine whether a content item is being edited by a native application 255, these behaviors can be used by presence management module 204 to determine presence relating to editing or modifying a content item.

Native applications 255 may typically be executed on device 100 independently from one another, and may permit communication between the applications and other applications or processes executing on device 100. Native applications 255 typically provide information to processes using APIs, which permit applications to request information from the executing process. For example, native applications 255 may present an API permitting a request for UI objects of an internal UI state 290 managed by the application 255, or to indicate the file system path (e.g., including title, file system folder location, etc.) of a UI Object, or to request a file system path associated with a content item opened (e.g., currently focused) by the native application 255.

Client application 200 manages access to content management system 110. Client application 200 includes user interface module 202 that generates an interface to the content accessed by client application 200, as variously illustrated herein, and is one means for performing this function. The generated interface is provided to the user by display 220. Client application 200 may store content accessed from a content storage at content management system 110 in local content data store 208. While represented here as within client application 200, local content data store 208 is stored with other data for client device 100, e.g., in non-volatile storage. When local content data store 208 is stored this way, the content is available to the user and other applications or modules, such as native application 255, when client application 200 is not in communication with content management system 110. Content access module 206 manages updates to local content data store 208 and uses synchronization logic to communicate with content management system 110 to synchronize content modified by client device 100 with content maintained on content management system 110. One example of such synchronization logic is provided in U.S. Pat. No. 9,053,165, filed Sep. 27, 2013, which is hereby incorporated by reference in its entirety. Client application 200 may take various forms, such as a stand-alone application, an application plug-in, or a browser extension.

Content management system 110 may provide additional data for synchronizing content items, such as information designating that a content item has been deleted, or that the device 100 is viewing or editing an outdated version of a content item.

Interaction management module 204 obtains and manages interaction information relating to a user's synchronized content items. The interaction management module 204 can be a distinct module from the native applications 255 being monitored by interaction management module 204 for presence information and can execute as a separate process. Interaction management module 204 detects interaction events occurring on device 100 for synchronized content items. Interaction management module 204 may detect interaction events by monitoring presence events, or by monitoring received user inputs such as comments and messages. Interaction events indicate that a user has interacted with a content item. Interactions include viewing the content item, editing the content item, saving the content item, commenting on the comment item, sending a message related to the content item, and collaborating in the content item. Interaction management module 204 sends notifications about interaction events and other interaction information to content management system 110.

To determine many types of interaction information, interaction management module 204 may receive interaction information through user interface elements. To determine presence information related to a synchronized content item, interaction management module 204 monitors UI objects associated with target native applications 255. Interaction management module 204 can monitor all user interface elements, or alternatively monitor just certain target UI objects, such as after the UI object is associated with a content item. In some embodiments, the UI extender module 265 monitors UI events of target UI objects, and communicates interaction information to the interaction management module. Monitored presence data store 210 includes information maintained by interaction management module 204 to indicate that a particular UI object or content item is monitored to determine actions relating to the synchronized content item. For example, monitored presence data store 210 may include a database that stores target UI objects and/or target applications.

While shown here as a part of client application 200, in various implementations content access module 206 and interaction management module 204 can be separated into distinct modules for performing their respective functions. Similarly, various modules and data stores are described separately throughout this disclosure for convenience and in various implementations are combined or further separated into separate components as desired.

Figure 3:
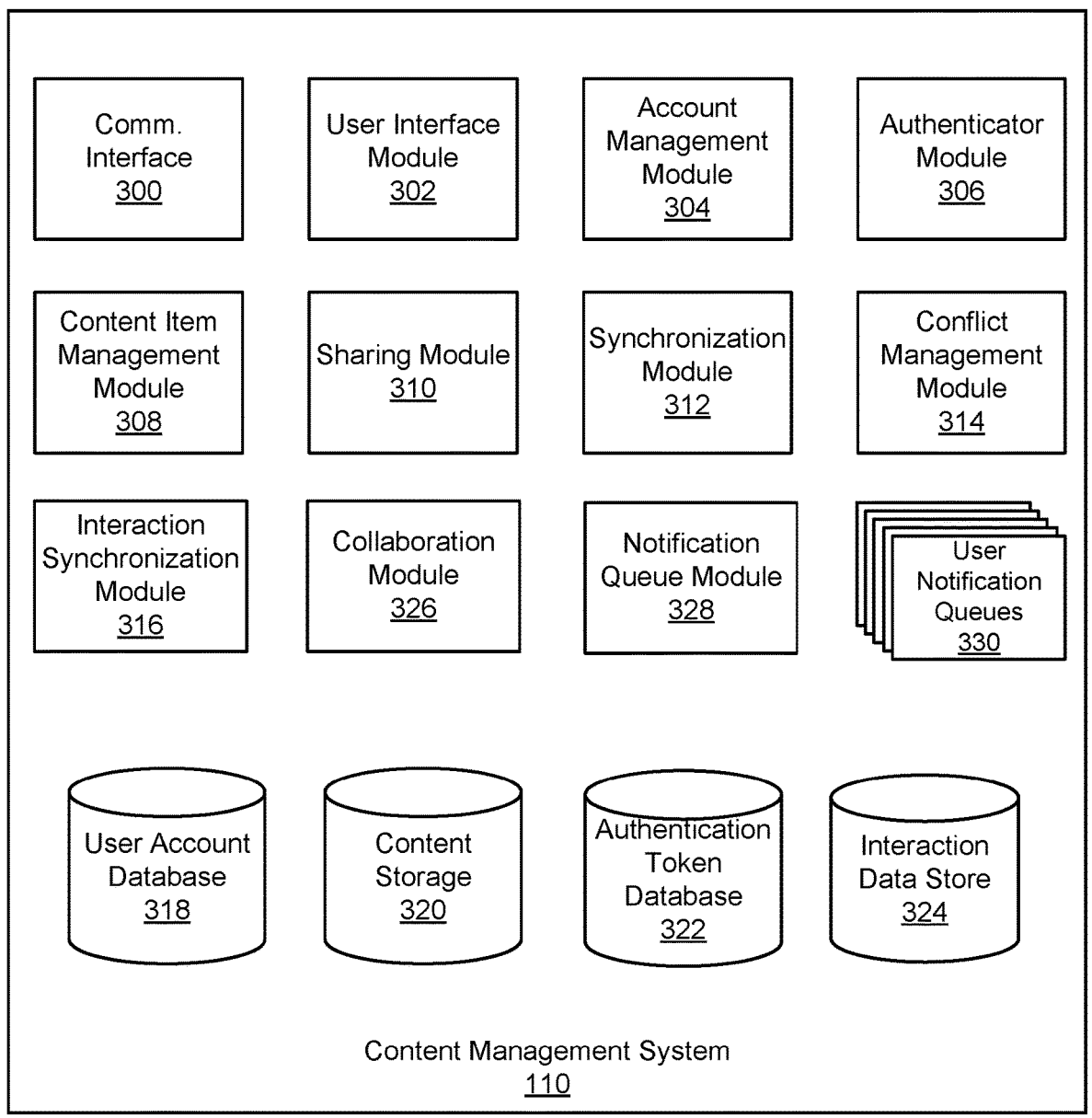
FIG. 3 shows components of a content management system.

FIG. 3 shows components of content management system 110 of FIG. 1, according to one embodiment. When using content management system 110, to facilitate the various content management services, a user can create an account with content management system 110. Each user's account is associated with an identifier, such as a userID or a user name. In one embodiment, the user's account information is maintained in user account database 318. User account database 318 can store profile information for registered users. In some cases, the only personal information in the user profile is a username and/or email address. However, content management system 110 can also be configured to accept additional user information, such as password recovery information, demographics information, payment information, and other details necessary to provide content management system functionality.

User account database 318 can also include account management information, such as account type, e.g., free or paid; usage information for each user, e.g., file edit history; maximum storage space authorized; storage space used; content storage locations; security settings; personal configuration settings; content sharing data; etc. Account management module 304 can update and/or obtain user account details in user account database 318. Account management module 304 can interact with any number of other modules in content management system 110.

An account can be associated with multiple devices 100, and content items can be stored in association with an account. The stored content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photo folder that is intended for photo content items and that provides specific attributes and actions tailored for photos; an audio folder that provides the ability to play back audio file content items and perform other audio related actions; or other special purpose folders. An account can also include shared folders or group folders that are linked with and available to multiple user accounts. The permissions for multiple users are different for a shared folder. In one embodiment, the account is a namespace that is associated with several users, each of whom is associated with permissions to interact with the namespace.

In one embodiment, the content is stored in content storage 320. Content storage 320 can be a storage device, multiple storage devices, or a server. Alternatively, content storage 320 can be a cloud storage provider or network storage accessible via one or more communications networks. In one configuration, content management system 110 stores the content items in the same organizational structure as they appear on the device. However, content management system 110 can store the content items in its own order, arrangement, or hierarchy.

Content storage 320 can also store metadata describing content items, content item types, and the relationship of content items to various accounts, folders, or groups. The metadata for a content item can be stored as part of the content item or can be stored separately. In one configuration, each content item stored in content storage 320 can be assigned a system-wide unique identifier.

Content storage 320 can decrease the amount of storage space required by identifying duplicate content items or duplicate segments of content items. In one embodiment, for example, a content item is shared among different users by including identifiers of the users within ownership metadata of the content item (e.g., an ownership list), while storing only a single copy of the content item and using pointers or other mechanisms to link duplicates with the single copy. Similarly, content storage 320 can store content items using a version control mechanism that tracks changes to content items, different versions of content items (such as a diverging version tree), and a change history. The change history includes a set of changes that, when applied to the original content item version, produces the changed content item version.

In one embodiment, content management system 110 automatically synchronizes content items with one or more devices using synchronization module 312. The synchronization is platform-agnostic. That is, the content items are synchronized across multiple devices 100 of varying type, capabilities, operating systems, etc. For example, client application 200 synchronizes, via synchronization module 312 at content management system 110, content in the file system 275 of device 100 with the content items in an associated user account on system 110. Client application 200 can synchronize any changes to content items in a designated folder and its sub-folders with the synchronization module 312. Such changes include new, deleted, modified, copied, or moved files or folders. Synchronization module 312 also provides any changes to content associated with device 100 to client application 200. This synchronizes the local content at device 100 with the content items at content management system 110.

Conflict management module 314 determines whether there are any discrepancies between versions of a content item located at different devices 100. For example, when a content item is modified at one device and at a second device, differing versions of the content item may exist at each device. Synchronization module 312 determines such versioning conflicts, for example by identifying the modification time of the content item modifications. Conflict management module 314 resolves the conflict between versions by any suitable means, such as by merging the versions, or by notifying one or more of the devices of the later-submitted version.

A user can also view or manipulate content via a web interface generated by user interface module 302. For example, the user can navigate in web browser 250 to a web address provided by content management system 110. Changes or updates to content in content storage 320 made through the web interface, such as uploading a new version of a file, are synchronized back to other devices 100 associated with the user's account. Multiple devices 100 can be associated with a single account and files in the account are synchronized between each of the multiple devices 100.

Content management system 110 includes communications interface 300 for interfacing with various devices 100, and with other content and/or service providers via an API, which is one means for performing this function. Certain software applications access content storage 320 via an API on behalf of a user. For example, a software package, such as an app on a smartphone or tablet computing device, can programmatically make calls directly to content management system 110, when a user provides credentials, to read, write, create, delete, share, or otherwise manipulate content. Similarly, the API can allow users to access all or part of content storage 320 through a web site.

Content management system 110 can also include authenticator module 306, which verifies user credentials, security tokens, API calls, specific devices, etc., to determine whether access to requested content items is authorized, and is one means for performing this function.

Content management system 110 includes a sharing module 310 for sharing content publicly or privately. Sharing content publicly can include making the content item accessible from any computing device in network communication with content management system 110. Sharing content privately can include linking a content item in content storage 320 with two or more user accounts so that each user account has access to the content item. The content can also be shared across varying types of user accounts.

In some embodiments, content management system 110 includes a content management module 308 for maintaining a content directory that identifies the location of each content item in content storage 320, and allows client applications to request access to content items in the storage 320, and which is one means for performing this function. A content entry in the content directory can also include a content pointer that identifies the location of the content item in content storage 320. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts.

To share a content item privately, sharing module 310 adds a user account identifier to the content entry associated with the content item, thus granting the added user account access to the content item. Sharing module 310 can also remove user account identifiers from a content entry to restrict a user account's access to the content item.

To share content, sharing module 310 generates a custom network address, such as a URL, which allows any web browser to access the content in content management system 110. In some implementations, access using the network address can be provided without limits or without authentication or can be restricted such as by a password, only available within a set timeframe, only available from certain locations or networks, or only available for a limited number of total accesses or simultaneous accesses using that network address. The sharing module 310 includes content identification data in the generated URL, which can later be used by content management system 110 to properly identify and return the requested content item. For example, sharing module 310 can include the user account identifier and the content path in the generated URL. The content identification data included in the URL can be transmitted to content management system 110 by a device to access the content item. In addition to generating the URL, sharing module 310 can also record that a URL to the content item has been created. In some embodiments, the content entry associated with a content item can include a URL flag indicating whether a URL to the content item has been created.

Interaction synchronization module 316 receives presence information from a device, stores it as part of a presence record in interaction data store 424 and determines a user presence with respect to a content item. Each user is associated with a user presence describing presence records associated with that user with respect to a content item, which can be without reference to any particular user device, process, or user interface element. While presence information may describe presence with respect to a particular user interface element or process, this presence associated with a user is termed a user presence. Example user presence states include collaborating, editing, viewing, open, and not present. In this example, a collaborating user presence state indicates the content item is associated with a user interface element that is presented for viewing and modification on two or more devices 100, an editing user presence state indicates the content item is associated with a user interface element that has modified the content item, a viewing user presence state indicates the content item is associated with an active user interface element on a device 100, while an open user presence state indicates a user interface element is associated with the content item and has opened the content item, but has not yet closed the content item. Various embodiments may use more or fewer user presence states. For example, one embodiment includes only editing, viewing and not present, in which case user interface elements that have opened the content item but are not the active user interface element is treated as viewing or not present. Obtaining and tracking presence information is also further described in U.S. patent application Ser. No. 14/635,192, incorporated by reference herein.

Interaction synchronization module 316 manages synchronization of interaction information across devices 100. Devices 100 provide interaction information to interaction synchronization module 316. Interaction synchronization module 316 stores interaction information in interaction data store 324. Interaction synchronization module 316 sends interaction information about synchronized content items to synchronized devices 100 for display to users. Interaction synchronization module 316 may further send instructions to notify users of new or unviewed interaction information. In one embodiment, devices 100 send viewing information to interaction synchronization module 316 indicating whether and when users have viewed interaction information. Viewing information is stored in interaction data store 324. In another embodiment, viewing information indicates whether and when users have interacted with interaction information. Interaction synchronization module 316 may use this information to avoid duplicate notifications on multiple devices 100 associated with the same user. For example, if a user is notified of new interaction information on a first device 100 and views the interaction information, this event will be stored such that the user will not be notified about the same interaction information on a second device 100.

In one embodiment, interaction information stored in interaction data store 324 is accessible by client application 200 so that users may view and interact with stored interaction information related to a content item. In some embodiments, UI extensions are generated as discussed herein to provide UIs to facilitate the user viewing and interacting with stored interaction information related to a content item. Stored interaction information may include metadata such as interaction event timestamps and version information. Version information associates interaction events with different versions of a content item. In one embodiment, stored interaction information is provided to users of devices 100 as a content item history log, in which interaction information and metadata is displayed chronologically. In this way, users may easily view interaction information in one place and better understand the context of changes, edits, views and comments to a content item. For example, a user may see that a content item was edited at 3:00 PM, and the editing user provided the comment "changed the conclusion paragraph" at 3:01 PM. This gives users a comprehensive view of the content item and entire editing process in one place.

In one embodiment, content management system 110 includes collaboration module 326. Collaboration module 326 can facilitate collaboration between devices 100. For instance, collaboration module 326 may initiate a device handshake by sharing a device's address with another device so that collaboration may occur. Further, collaboration module 326 can perform any of the tasks that are performed by collaboration module 207 of a device 100 or by any other module of client application 200.

Notification queue module 328 creates and manages user notification queues 330 for shared content items. User notification queues 330 are stored at content management system 110 and sent to devices 100. A user notification queue 330 is a group of one or more interactions with a shared content item that is presented to a user to indicate recent interactions with the shared content item by sharing users. In one embodiment, each sharing user associated with a content item has a user notification queue 330 corresponding to that content item. Different users' user notification queues for a particular content item may differ.

In one embodiment, notification queue module 328 receives a notification of an interaction event, and determines interactions that are candidates to be added to user notification queues 330. The notification queue module 328 modifies user notification queues 330 corresponding to a shared content item. Modifying user notification queues 330 may include adding candidate interactions to the notification queue and removing interactions already present in the notification queue. When an interaction event corresponding to a shared content item is received by the content management system 110, the notification queue module 320 determines whether to add interactions to and/or remove interactions from the sharing users' user notification queues 330. Types of interactions added to a user notification queue 330 may include content item views, content item edits, content item collaborations, content item comments, and content item messages.

In one embodiment, interactions have an associated interaction priority. An interaction priority specifies a relative priority of an interaction type to other interaction types. For example, a content item edit may have a higher priority than a content item view. Interaction priorities are specified by an implementer of the content management system 110 or by a user of the content management system 110. The notification queue module 328 determines the interaction types and interaction priorities for candidate interactions and interactions in user notification queues 330. In various embodiments, the notification queue module 328 selects higher priority interactions to add to user notification queues 330 and lower priority interactions to remove from user notification queues 330. For example, the notification queue module 328 may compare the priority of a candidate interaction by a user A to the priority of interactions by user A already present in a notification queue 330. If the candidate interaction is a lower priority interaction than an interaction in the user notification queue 330, the candidate interaction is not added to the queue. If the candidate interaction is a higher priority interaction than an interaction in the user notification queue 330, the candidate interaction is added to the queue, and the interaction already in the queue is removed from the queue. This allows users to be presented with other users' higher priority interactions with a content item, which provides important information for the users without also providing less important information that may confuse the user or waste space in a user interface object or element.

Notification queue module 328 may send user notification queues 330 to devices 100. In one embodiment, notification queue module 328 sends a user notification queue 330 responsive to receiving a notification that a user has accessed a content item. The access notification may come directly from device 100 or from interaction synchronization module 316. The access notification is generated responsive to detecting a presence event consistent with access of the content item, such as opening a content item for viewing or editing. In one embodiment, notification queue module 328 clears a user notification queue 330 responsive to receiving a notification that the associated user viewed the notification queue. This way, the user will not be presented with notifications that the user has already viewed.

Content management system 110 may be implemented using a single computer, or a network of computers, including cloud-based computer implementations. For the purposes of this disclosure, a computer is a device having one or more processors, memory, storage devices, and networking resources. The computers are preferably server class computers including one or more high-performance CPUs and 1G or more of main memory, as well as computer readable, persistent storage, and running an operating system such as LINUX or variants thereof. The operations of content management system 110 as described herein can be controlled through either hardware or through computer programs installed in computer storage and executed by the processors of such server to perform the functions described herein. These systems can include other hardware elements necessary for the operations described here, including network interfaces and protocols, input devices for data entry, and output devices for display, printing, or other presentations of data, but which are not described herein. Similarly, conventional elements, such as firewalls, load balancers, failover servers, network management tools and so forth are not shown so as not to obscure the features of the system. Finally, the functions and operations of content management system 110 are sufficiently complex as to require implementation on a computer system, and cannot be performed in the human mind simply by mental steps.

In one configuration, components described below with reference to content management system 110 are incorporated into devices 100 that can share and synchronize content items without management by content management system 110. These devices 100 may synchronize content and share interaction information over network 120 or via a direct connection as described above. In this configuration, devices 100 may incorporate functionality of synchronization module 312, conflict management module 314, interaction synchronization module 316, and other modules and data stores for incorporating functionality described below as provided by content management system 110. Accordingly, devices 100 in this configuration operate in a peer-to-peer configuration and may do so without content management system 110 or network 120.

UI Extension Management Processes

Figure 4:
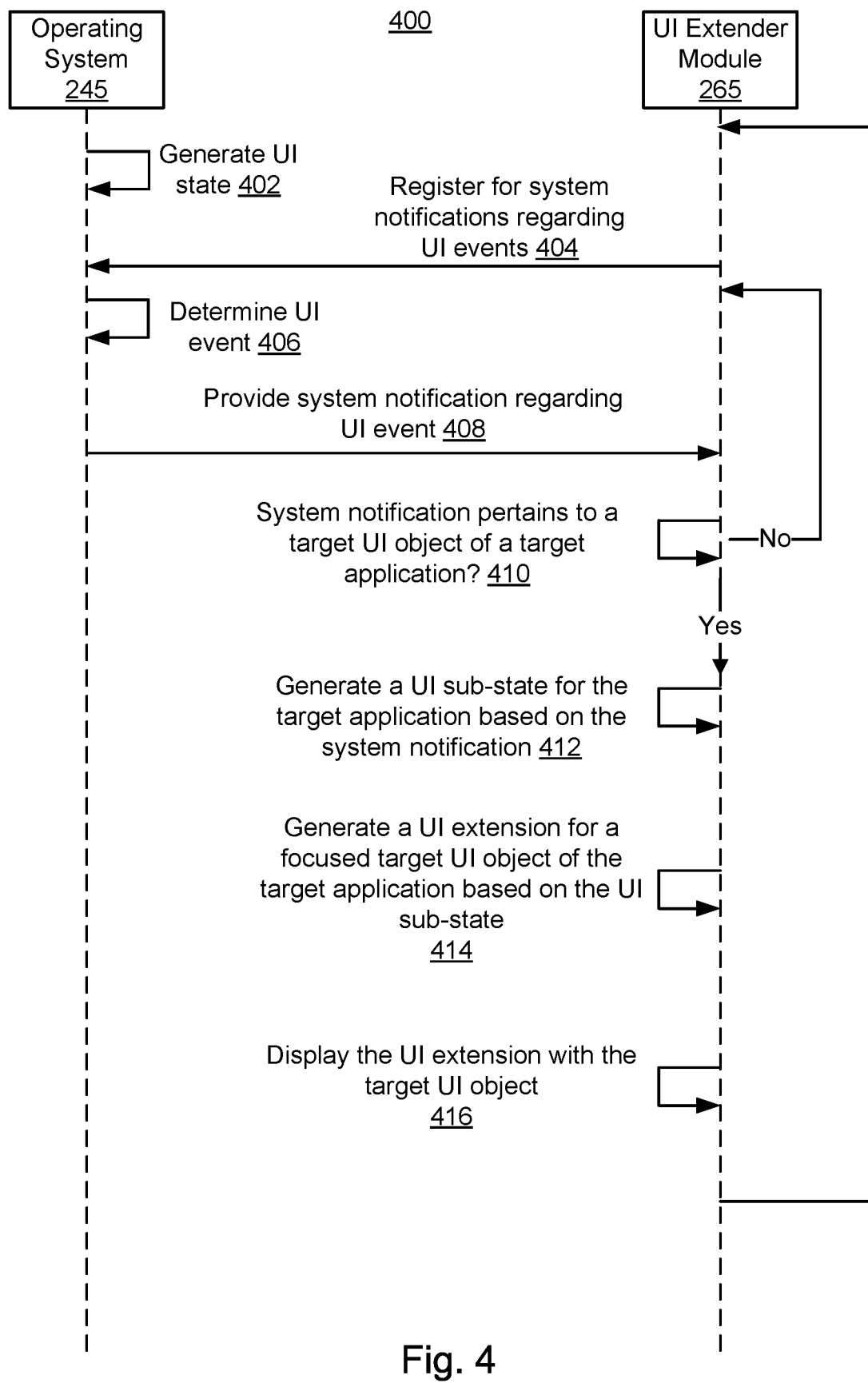
FIG. 4 shows an example process for extending a UI of a target application on a display of a computer system.

FIG. 4 shows an example process 400 for extending UI on a display of a computer system for a target application. Process 400 utilizes communications between the operating system 245 and the UI extender module 265 regarding UI events. The set of communication types between the UI extender module 265 and operating system 245 can be defined by APIs, such as the UI API 280 for communications regarding UI events.

Process 400 is used to generate a UI extension for a UI of a native application 255 based on maintaining a UI sub-state (e.g., UI sub-state 274) for the UI of the native application 255. The UI sub-state 274 is updated based on registering with and receiving from the operating system 245 system notifications regarding UI events for target UI objects of the target application. For example, process 400 can be performed by a UI extender module 265 in connection with operating system 245 to provide a UI extension overlay for a UI of a native application 255.

At 402, the operating system 245 generates a UI state 285. As discussed above, the UI state 285 refers to a master UI state managed by the operating system 245, and includes all UI objects managed by the operating system 245 across multiple native applications 255. In that sense, the UI state 285 provides a data representation of UIs executing on the operating system 245. The operating system 245 manages the UI state 285, such as by updating the UI state 285 in response to receiving user inputs or programmatic instructions.

FIG. 5 shows an example representation of a UI state 500 managed by an operating system. The UI state 500 is represented by a graph or tree including UI object nodes, and directed edges defining parent-child relationships between the nodes. The UI state 500 represents the user interfaces managed by the operating system 245 as a hierarchy of UI objects. A node may represent a single UI object or may represent an abstraction enveloping one or more (e.g., child) UI objects. For example, the UI object nodes 510-530 represent individual UI objects such as window objects 510, 526, and 528; menu object 512; button objects 516 and 518; list view object 514; file objects 520, 522, and 524; and folder object 530. In another example, the OS object 502 and application objects 504, 506, and 508 represent abstractions enveloping their child UI objects. The types or classes of UI objects that are supported may vary depending on platform or operating system, and are not necessarily limited to the examples shown in the UI state 500. In some embodiments, the UI state 500 includes only a single class of IU objects, such as the window object class for the Windows® 10 operating system.

The OS object 502 represents the highest level operating system node. The OS object may include a focused application property defining the focused application 255, and/or a focused UI object property defining a focused UI object of the focused application 255. Each native application 255 having a UI managed by the operating system 245 is represented by an application object that is the child of the OS object 502, such as application objects 504, 506, and 508. In some embodiments, the application object may include a focused application property defining whether the application object is being focused, and/or a focused UI object property defining focused or selected UI object of the application object. In some embodiments, each UI object may include a focused property defining whether the object is the currently focused UI object. As such, the UI state 500 may define a currently focused UI object. Changes to UI object focus (among other things) trigger system notifications regarding UI events, and may result in changes to UI extensions as discussed in further detail below.

Figure 6A:
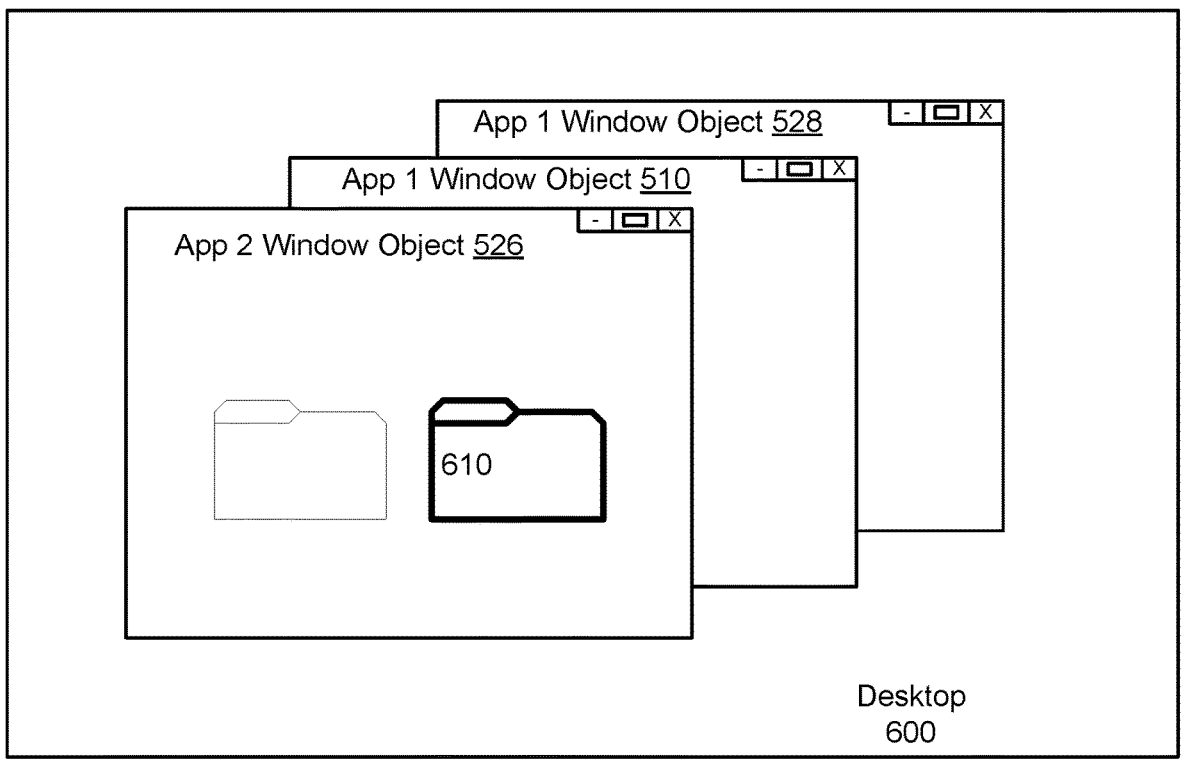
FIGS. 6A and 6B show UI object focus changes on a desktop display of a device.
Figure 6B:
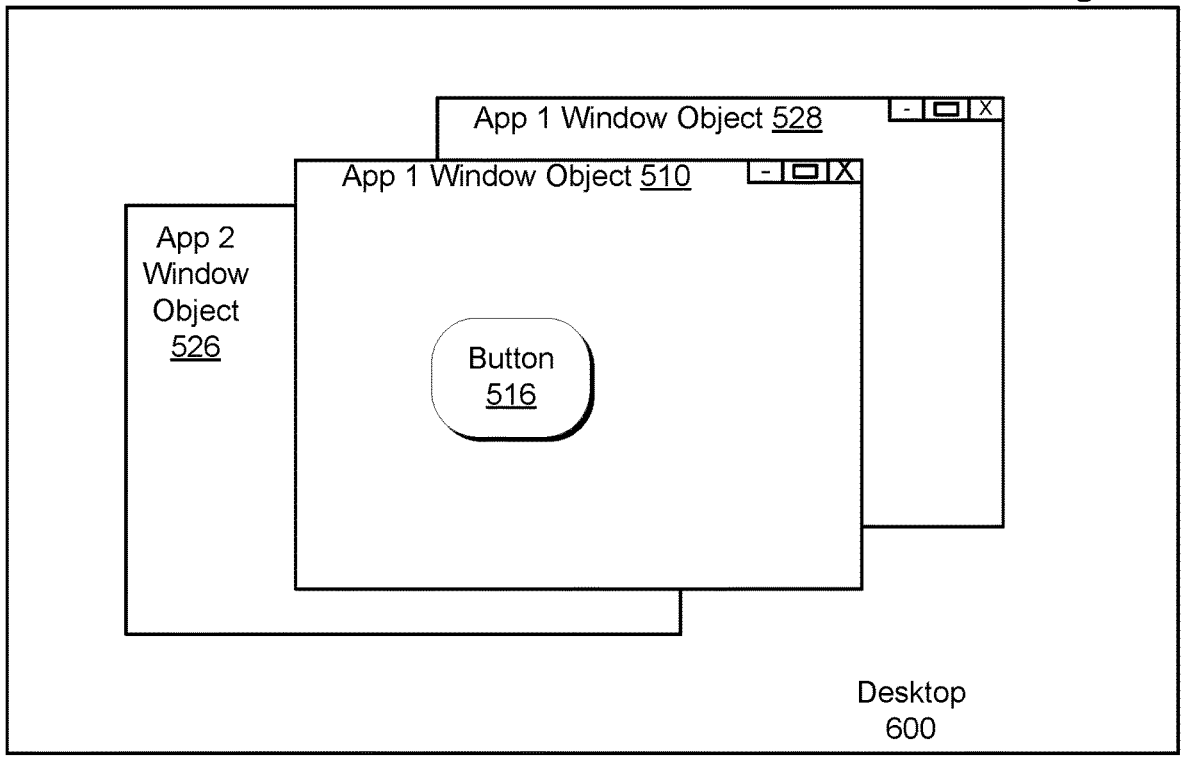

FIGS. 6A and 6B show an example of a UI object focus change on desktop 600 rendered on display 220 of device 100. In FIG. 6A, window objects 510, 526, and 528 are displayed on desktop 600 and viewable by the user. In this embodiment, desktop 600 is a general container or frame maintained by operating system 245 that encloses user interface objects on display 220. In FIGS. 6A and 6B, the UI objects are window objects in a desktop computing environment. In other configurations, such as a mobile device, or other display with limited area, only a single UI object might be displayed at a time. As shown by FIG. 6A, window object 526 is the focused or active window object, shown as the front window, partially obscuring window objects 510 and 528, and within window 526, folder 610 is the currently focused object. In FIG. 6B, the focus changed to window object 510, which is now the front window and the active or focused window object, and button 516 is the focused object. The focus may change in response to user input interactions with the window object 510, or in response to programmatic instructions. In certain operating systems and configurations, a UI object can have focus (e.g., is receiving user input) without being the front UI object.

Returning to FIG. 5, the three application objects 504, 506, and 508 of the UI state 500 each represent a different application 255 executing on the operating system 245. Each application object may also include one or more child UI objects, such as window objects 510 and 528 for the target application 540. Window objects are UI objects representing window elements. For an example where the native application is a file system browser, a window object may represent a folder, and child objects of the window object may include content items stored within the folder and/or menus/buttons for interacting with the content items. For example, the window object 510 includes a child list view object 514, which further includes child file objects 520-524 and folder object 530. The window object 510 further includes a child menu object 512. The menu object 512 further includes child button objects 516 and 518.

A single application object may include multiple window objects, such as multiple windows each corresponding with an opened file of a word processing application, or multiple windows of a file system browser application each corresponding with a different folder within a file system. For example, application object 504 includes window object 510 and 528. The UI state 500 may include UI objects associated with multiple applications, each of which may include child objects. For example, the UI state 500 includes application objects 504, 506, and 508 each associated with a different application 255. Application object 506 also includes a window object 526. Other child objects of the application objects 506 and 508 are not shown in FIG. 5 to avoid overcomplicating the disclosure.

Figure 7:
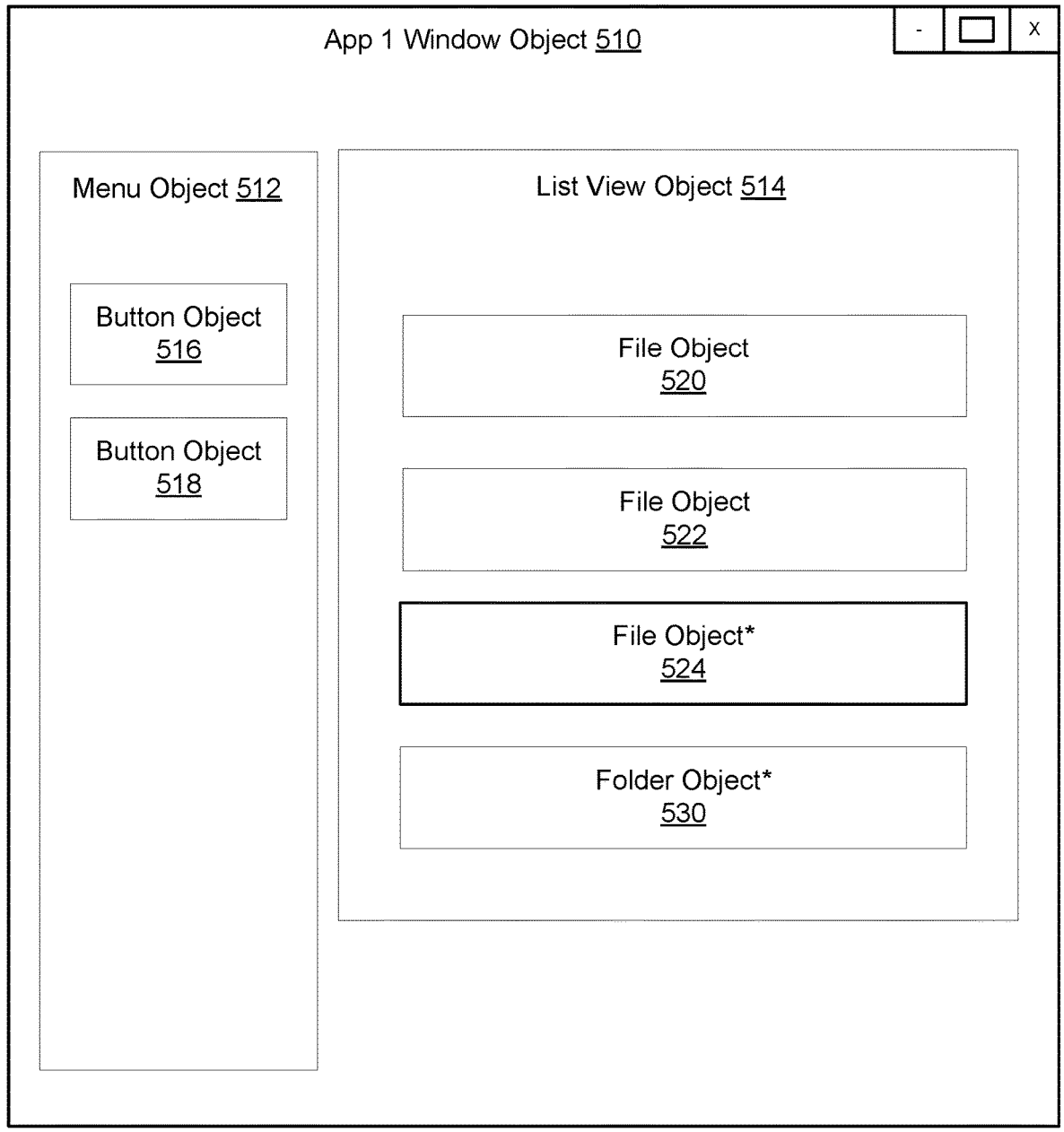
FIG. 7 shows an example of a UI of a target application.

FIG. 7 shows an example of a UI of the target application 540. In particular, the UI of the target application 540 includes graphical representations of the UI objects represented by the nodes of the UI state 500 shown in FIG. 5. The graphical representations of the UI objects are generated based on the graphical properties of the UI objects, such as by the graphics engine 294. As such, the UI includes the window object 510, representing the main window of the target application 540. If the target application is a file system browser, then the main window may represent an opened folder of the file system.

Within the window object 510 are its child objects, the menu object 512 and the list view object 514. Within the menu object 512 are its child objects, the button objects 516 and 518. For example, the button objects represent buttons for actions associated with the opened folder. Within the list view object 514 include file objects 520, 522, and 524 and folder object 530. For example, these UI objects represent the content items stored in the folder, such as files or subfolders.

Returning to FIG. 4, in addition to generating the UI state 400, the operating system 245 can maintain the UI state 400, and update the UI state 400 when appropriate. For example, the UI state is updated in response to detecting user interface input events, or in response to programmatic application instructions. The operating system 245 manages the UI state to facilitate user input handling and user interface presentation across the applications 255 executing on the operating system 245.

At 404, the UI extender module 265 registers for system notifications regarding UI events from the operating system 245. The UI extender module 265 registers for the events regarding UI events using a UI API 280, such as the Accessibility API for OS X® or the Windows Shell API for Windows® 10.

Operating system APIs define protocols for how an application may interact with processes of the operating system 245. For example, the operating system 245 communicates UI events and related messages with the UI extender module 265 via the UI API 280. The UI API 280 provides for communications that allow the UI extender module 265 to register and receive notifications regarding UI events. Some example UI events may include focus UI object change (e.g., focused window change), UI object creation, UI object movement, UI object resize, UI object minimize, UI object de-minimize, UI object destroy (e.g., removed from the UI), UI object create, application 255 activate, application 255 deactivate, among other things.

The UI API 280 allows the UI extender module 265 to register for system notifications by specifying the target applications and/or target UI objects (e.g., based on UI object ID or UI object types known to exist in a target application). The operating system 245 can send system notifications for UI events pertaining to the UI objects of the target applications or for the particular target UI objects in accordance with the registrations when the UI events are detected. Because some UI APIs do not expose the UI state 400 completely, the UI extender module 265 can reconstruct portions of the UI state 400, represented by the UI sub-state 274 of a target application, based on UI event notification handling, even if the UI state 400 is not otherwise exposed by the operating system 245.

In connection with registering for system notifications regarding UI events, the UI extender module 265 enters a listening state once the appropriate registrations have been completed. The system notifications are triggered asynchronously at virtually any time, such as in response to user input or programmatic instruction, and thus the listening state prepares the UI extender module 265 for asynchronous UI event handling.

At 406, the operating system 245 detects a UI event. UI events refer to events that include changes to the UI state of an application, such as a change to a UI object property of the UI state 400. The UI event may include changes to graphical properties of the UI object such as height, width, and (e.g., X-Y coordinate pair) location or changes to other properties such as file path, input status, etc.

The operating system 245 updates the UI state 400 in connection with providing UIs for native applications 255. For example, the operating system 245 receives user inputs from user input module 260. The operating system 245 associates the user inputs with UI objects, such as the currently focused UI object (e.g., window object) when the user input is generated. The operating system 245 detects the occurrence of a UI event based on the user input. For example, if the user input indicates a window object resize, the operating system 245 generates a resize UI event for the window object. The operating system 245 updates the UI state 400 based on the UI event for the UI object. For example, for a window object resize event, the height or width UI object parameter of the window object is updated. The UI provided to the user on the display by the operating system 245 may also be updated based on the updated UI state 400.

At 408, the operating system 245 provides a system notification regarding the UI event to the UI extender module 265. The operating system 245 generates the system notification based on an update to the UI state for which the UI extender module 265 has registered to receive notifications, and sends the system notification to the UI extender module 265. The system notification can be provided as an asynchronous callback for the system notification registration performed at 404. The system notification may include a UI object ID or GUID that identifies the UI object, and may further include an indication of one or more updated UI object properties of an UI object, such as the graphical properties if applicable.

At 410, the UI extender module 265 can determine whether the system notification pertains to a target UI object of a target application, or in other words whether the notification for an application or object of interest. The UI extender module 265 accesses the monitored presence data store 210 or other database that stores target UI objects and/or target applications based on their object IDs. As such, upon receipt of a system notification including a particular UI object ID, the UI extender module 265 attempts to match the object ID to the list of target objects and applications. If the object ID is listed, then the object is the target object of a target application.

In response to determining that the system notification does not pertain to a target UI object of a target application, process 400 may return to 402, where the operating system 245 continues to update the UI state 400 and detect UI events. Similarly, the UI extender module 265 continues listening and receiving the system notifications regarding the UI events from the operating system 245.

Returning to 410, in response to determining that the system notification does pertain to a target UI object of a target application, the UI extender module 265 generates a UI sub-state 274 for the target application based on the system notification. The UI extender module 265 via the UI sub-state generator 272 generates and manages the UI sub-state 274. UI sub-states 274 are separate from the UI state 285 managed by the operating system 245, and are used by the UI extender module 265 to track the changes of the master UI state 295 for target objects. The UI extender module 265 can generate a defined N number of UI sub-states for target applications executing on the operating system 245. In some embodiments, the N number of UI sub-states can be different for different system types, system configurations, or states of the system (e.g. based memory availability, processing power available, etc.). In some embodiments, UI sub-states are kept for a predefined amount of time. For example, a UI sub-state can expire if the target application has not been focused for a threshold amount of time. The UI sub-states for the expired target application can be deleted (e.g., even if the defined N number of UI sub-states has not been reached).

Can keeping sub-states be based on other factors, such as an expiration time (e.g. if threshold amount of time since target application has had focus then sub-states for that target application can be deleted)

With reference to FIG. 5, the UI state 500 maintained by the operating system 245 includes target UI objects and non-target UI objects, with the non-target UI objects being marked with a * symbol in FIG. 5. The UI sub-state 274 for the target application 540 is generated to include only the target UI objects. Thus, FIG. 8 shows an example of a UI sub-state 800 of the target application 540, which contains a subset of the objects in UI state 500, specifically only those objects that are themselves target application objects or target UI objects within the target application. Thus, the UI sub-state 800 includes application object 804, window object 810, menu object 812, list view object 814, button object 816, button object 818, file object 820, and file object 822, which respectively correspond with the application object 504, window object 510, menu object 512, list view object 514, button object 516, button object 518, file object 520, and file object 522 of the UI state 500. The non-target UI objects of the UI state 500 (e.g., window object 528, folder object 530, and file object 524 of the target application, and objects 506, 508, and 526 of non-target applications) are excluded from the UI sub-state 800. In some embodiments, the UI extender module 265 does not register for or receive system notifications regarding UI events for the non-target UI objects.

In addition to parent-child relationships, the UI sub-state 800 may further define or include some or all of the UI object properties of the target UI objects. As such, the UI sub-state 800 may represent a replicated subset of the UI state 500 managed by the operating system 245, including target UI objects of interest and excluding non-target UI objects.

The UI sub-state 800 is generated over time based on multiple system notifications of UI events received over time from the operating system 245. In some embodiments, the UI extender module 265 initiates registrations for UI events based on registering for target application activation/deactivation events. When a target application is activated, the UI extender module 265 traverses the UI state to register for system notifications regarding each target UI object. For example, when a target application is activated, the operating system 245 generates the application object node, and any child UI objects nodes. The operating system 245 sends a system notification regarding the activation event to the UI extender module 265. Using UI API calls for the target application, the UI extender module 254 requests the UI objects of the target application, and the operating system 245 sends the object IDs of these UI objects the UI extender module 265. The UI objects may be collected in a single request, or using multiple requests, such as by traversing nodes of the UI state of the target application. For each received UI object, the UI extender module 265 uses a set of rules defined for the target application to determine whether the UI object is a target UI object. If the UI object is a target UI object, the UI extender module 265 updates the UI sub-state for the target application by adding the target UI object to the UI sub-state. The UI extender module 265 then registers for system notifications regarding the target UI objects, and keeps the UI sub-state in coordination with the UI state based on the system notifications. Similarly, when an event indicates that a UI object or target application is no longer available (e.g., application or window closed, file moved or deleted, etc.), the UI extender module 265 may remove the UI object from the UI sub-state 800, and in some embodiments, can unregister for system notifications pertaining to the removed UI object.

At 414, the UI extender module 265 generates a UI extension for a focused target UI object of the target application based on the UI sub-state 800. When a target UI object becomes the focused UI object as indicated by a UI event, a UI extension for the focused target UI object can be generated or updated.

The graphical properties of the UI extension are maintained in coordination over time with the graphical properties of the focused target UI object such that the UI extension appears integrated with or attached to the UI of the native application 255. In some embodiments, the UI extension may further include UI objects (e.g., buttons, menus, etc.) that are contextually relevant to the focused UI object or the underlying content item of the focused UI object. Additional details regarding the creation and update of the UI extensions are discussed below in connection with FIG. 10.

Figure 9:
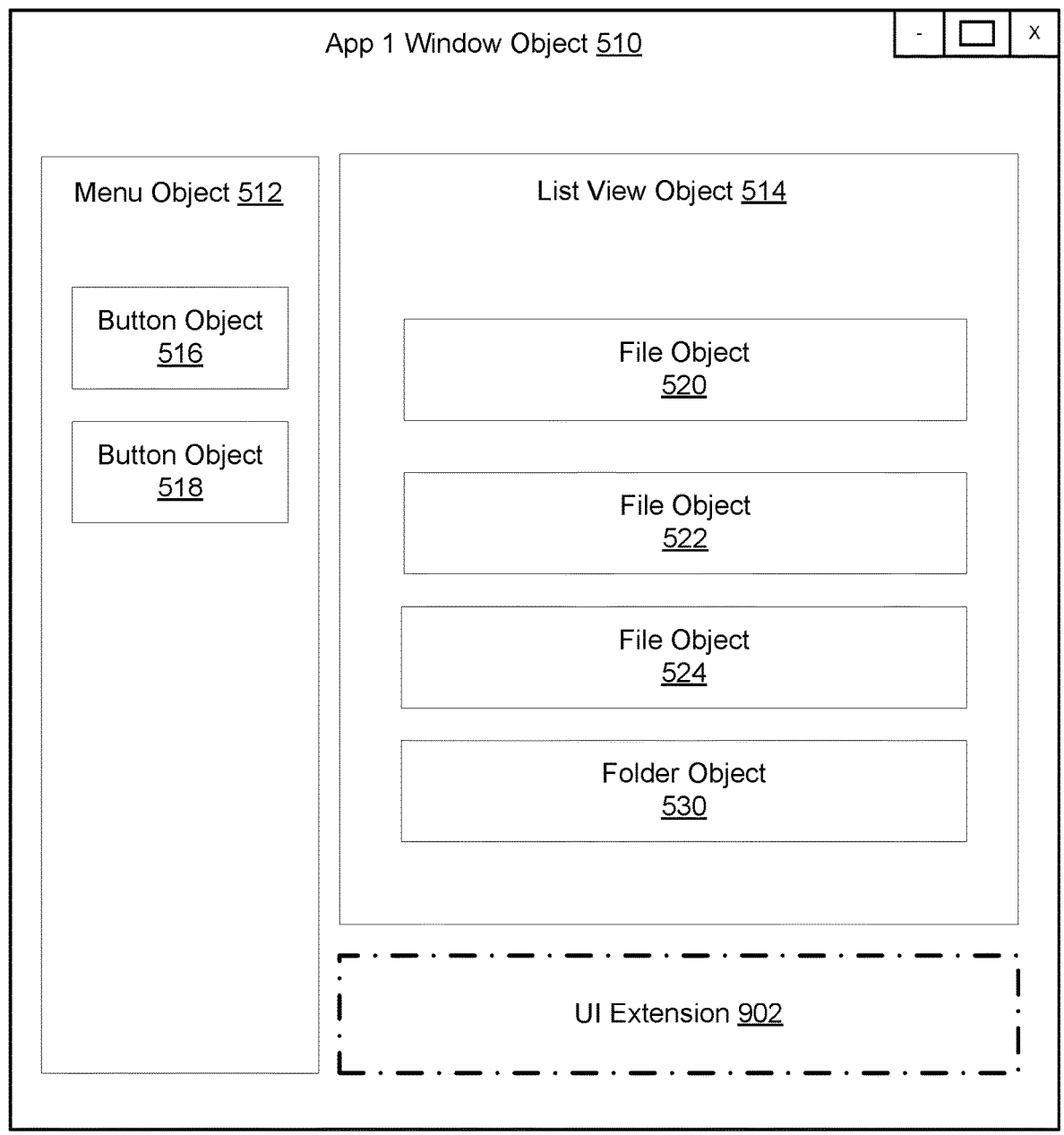
FIG. 9 shows an example of a UI of a target application with a UI extension.

At 416, the UI extender module 265 displays the UI extension. The UI extension can be displayed relative to a target UI object. FIG. 9 shows a schematic example of a UI of a target application 540 with a UI extension 902. The UI extension 902 has graphical properties such as height, length, and location. The graphical properties of the extension UI object are sized and located to appear integrated with or attached to the UI of the target application even though the UI extension 902 itself is separate from the actual underlying UI of the target application. This is done by rendering the UI extension 902 as an overlay in front of the UI of the target application, for example in front of the window object 510. When graphical properties of the UI objects of the target application are updated, the graphical properties of UI extension object(s) are updated accordingly to maintain the appearance of integration or attachment over time. For example, if the window object 510 is moved 100 pixels to the right, then the location of the UI extension 902 is immediately updated to shift its position exactly the same amount. This is done, as further explained below, by making use, for example, of the graphics API, which provides high frequency system notifications to the UI extender module 265 of changes to the objects in the user interface.

In some embodiments, the graphical properties (e.g., location, hidden or shown status, etc.) or functional capabilities (e.g., tools, buttons, etc.) of a UI extension may be customized by the user. For example, the user can customize the location of the UI Extension within the window of the target application by performing a drag and drop, or other user interface operation, on the UI extension. In some implementations, these customizations can be target application specific and/or can be stored and persistent across executions of target applications.

Process 400 is repeated such that the UI extension is generated and displayed in connection with one or more target UI objects over time. In that sense, process 400 provides a UI event loop that maintains a UI representation (the UI sub-state 800) separate from the state of the operating system's user interface (the UI state 500). As such, method 400 may return to 402, where the operating system 245 can continue updating the UI state 500, sending event notifications, and so forth.

Figure 10:
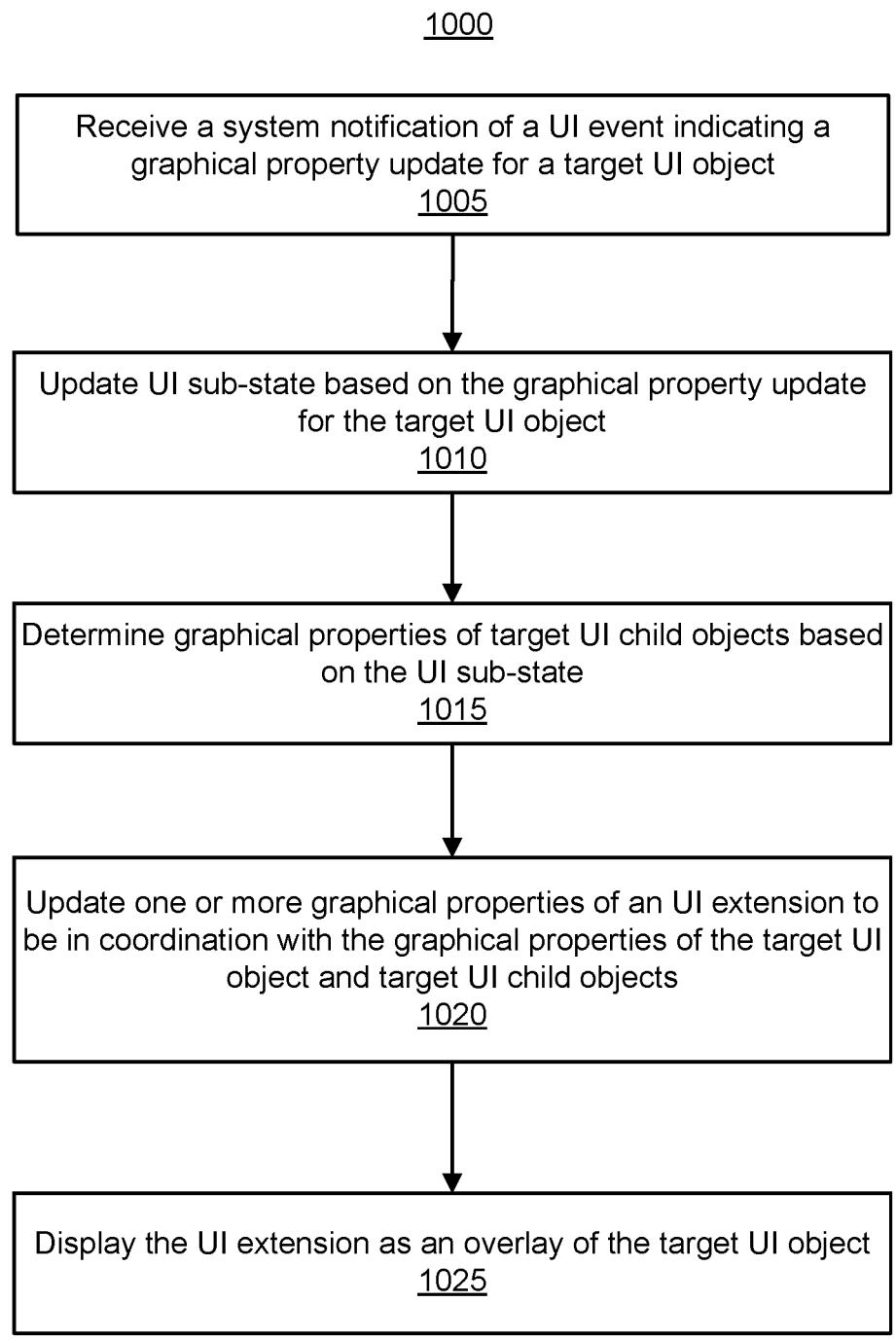
FIG. 10 shows an example of a process for updating a UI extension in coordination with a graphical property update of a UI object of a target application.

FIG. 10 shows an example of a process 1000 for updating a UI extension in coordination with a graphical property update of a UI object of a target application. Although the configuration of UI extensions is not limited by the target application or operating system, the graphical properties of a UI extension may change based on graphical property changes to target application UI objects to remain in coordination over time.

At 1005, the UI extender module 265 receives a system notification of a UI event indicating a graphical property update for a target UI object from the operating system 245. The discussion at 402-408 of process 400 is applicable at 1005.

The UI extender module 265 determines whether a UI event indicates a graphical property update for a target UI object. The graphical properties of a UI object may include parameters such as height, width, and X-Y location. The graphical properties may define the shape, size, and location of the UI object on the display. As discussed above, the UI extender module 265 may register for system notifications regarding UI events for target UI objects.

The UI extender module 265 maintains a UI sub-state 800, which may include a node representing the target UI object of the UI event. The UI sub-state 800 may include the graphical properties of each UI object. When an instance of graphical properties is received in a UI event, the UI extender module 265 determines that the UI event indicates a graphical property update for the target UI object. For example, the shape, size, or location of the target UI object may have changed. In another example, the received graphical properties are compared with previously stored graphical properties of the target UI object to determine whether the UI event indicates a graphical property update for the UI event.

At 1010, the UI extender module 265 updates a UI sub-state 800 based on the graphical property update for the target UI object. For example, the one or more previously stored UI object properties of the target UI object are updated based on UI object properties received from the UI event. If the target UI object is a new target UI object, the UI extender module 265 adds the target UI object to the UI sub-state 800. As such, the UI sub-state 800 tracks changes in the operating system's UI state 500 for target UI objects.

At 1015, the UI extender module 265 determines the graphical properties of one or more (if any) target UI child objects of the target UI object. A target UI child object refers to a target UI object that is a child of another target UI object within a UI state or sub-state. If the target UI object is a window object, the graphical property update for the target UI object may indicate that window object has moved or has been resized. Similarly, the child UI objects (e.g., menus, files, folders, etc.) of the window object may also have moved or resized based on the graphical property changes in the window object.

With reference to FIG. 8, menu object 812 and list view object 814 are target UI child objects of the window object 810. Parent-child relationships may define graphical property relationships. With reference to FIG. 9, the menu object 512 and list view object 514 are sized to fit within the space of the parent window object 710, and located within the graphical space of the parent window object 710.

The UI extender module 265 may reference the UI sub-state 800 to determine the target UI child objects of a target UI object, and to determine graphical properties of the target UI child objects such as height, width, and location. Target UI child objects are not necessarily limited to direct children, and in some embodiments, the UI extender module 265 can determine graphical properties of other descendent UI objects, such as grandchildren, great grandchildren, etc. of the target UI object. In some implementations, creation of a new UI descendent object of a target UI object can trigger the UI extender module 265 to determine whether to add the new UI descendent object to its sub-state and classify the new UI descendent object as another target UI object, registering for notifications of UI events for the new target UI object.

In some embodiments, changes in the graphical properties of target UI child objects also trigger UI events if the target UI child objects are registered for UI event notification. For each child target UI object, the operating system 245 can send a system notification indicating a UI event. For each child target UI object, the UI extender module 265 can compare the graphical properties of the target child UI object from the UI sub-state with the graphical properties of the target child UT object received from the system notification. If the graphical properties are different, the UI extender module 265 determines that the UI event indicates a graphical property update for the child target UI object.

At 1020, the UI extender module 265 updates the one or more graphical properties of a UI extension to be in coordination with the graphical properties of the target UI object and the target UI child objects. The UI extension includes one or more extension UI objects, such buttons, menus, lists or the like; these objects provide additional functionality and/or information that are relevant to the focused UI object. In some embodiments, the UI extender module 265 can maintain an internal UI state including extension UI objects. Updating a graphical property of the UI extension may include updating the internal UI state for the UI extension.

If the UI extension has not been previously generated, the UI extender module 265 generates the UI extension such that the UI extension is in coordination with the graphical properties of the target UI object and any target UI child objects. When in coordination, the UT extension operates like an integrated or attached object of the native application UI. The attachment can be arbitrary in that the application 255 and operating system 245 do not impose direct constraints on the graphical properties (e.g., size, location, appearance, content, etc.) of the UI extension. The UI extension is of any size, shape, and at any location, e.g., as determined by a developer or user.

Figure 11A:
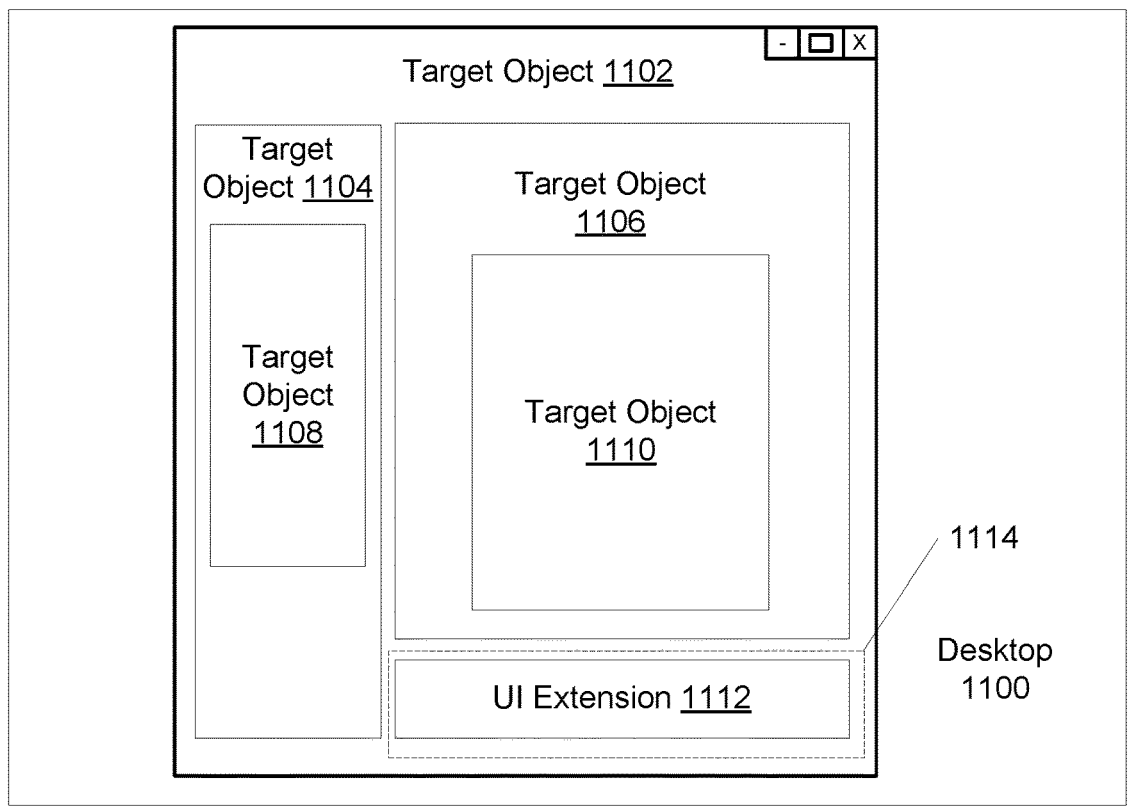
FIGS. 11a-11c show coordination of a UI extension with changes in target UI object graphical properties.
Figure 11B:
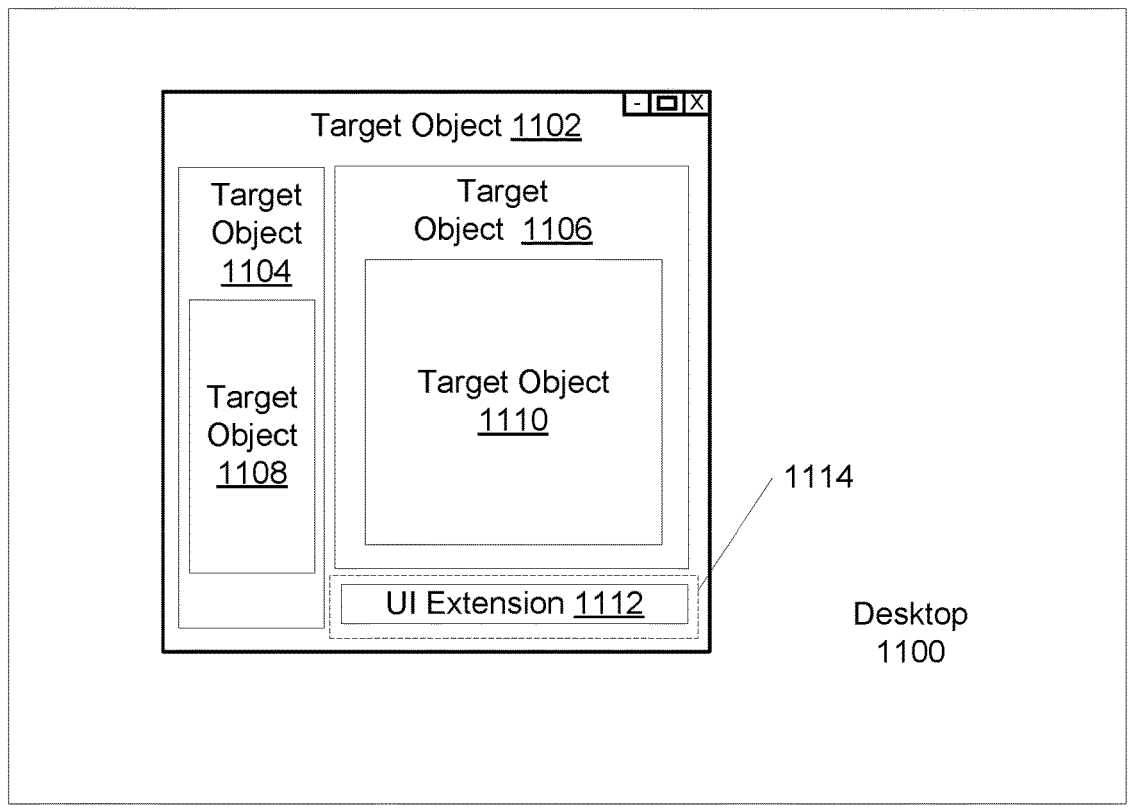
Figure 11C:
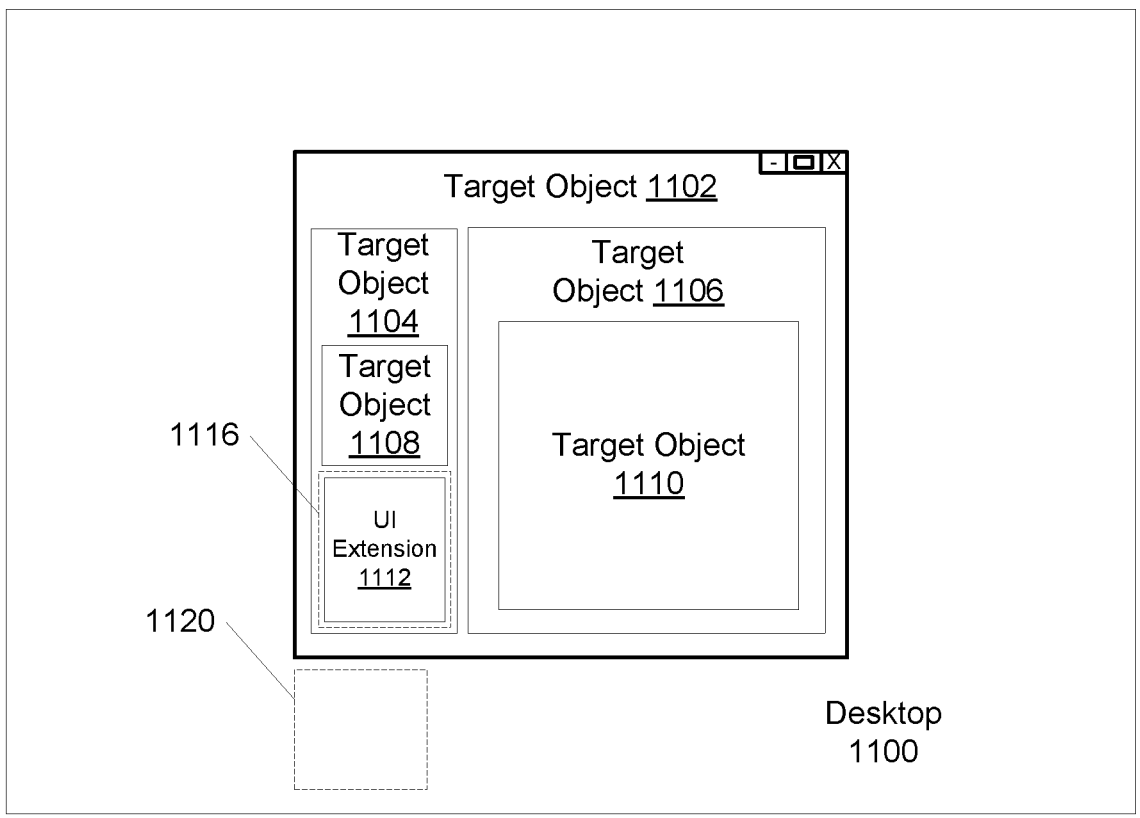

FIGS. 11*a*-11*c* show coordination of a UI extension 1112 with changes in target UI object graphical properties. In FIGS. 11A-11C, target UI objects 1102-1110 are displayed on desktop 1100 and viewable by the user. The window object 1102 includes child UI objects 1106 and 1104, and the child UI objects 1104 and 1106 respectively include child UI objects 1108 and 1110.

UI extension 1112 is provided in connection with the target UI objects 1102-1110. When the window object 1102 is moved or resized from an initial state as shown in FIG. 11*a*, the UI extension 1112 may also move or resize accordingly as shown in FIG. 11*b*. Moving or resizing a UI extension object may include updating one or more graphical properties of the UI extension such as height, width, or (e.g., center) location.

The UI extension 1112 is sized and located to attach in a particular way, such as within an open graphical region 1114 defined by the target objects 1102, 1104, and 1106. When the size and location of the open graphical region 1114 changes due to changes to the graphical properties of the target objects 1102, 1104, and 1106, the graphical properties of the UI extension are updated accordingly. In FIG. 11*b*, the UI extension 1112 is moved such that the UI extension 1112 remains attached at the bottom right corner of the window target object 1102 at the open graphical region 1114. The UI extension 1112 is further resized to appear to fit within the open graphical region 1114. Again, in this embodiment, the UI extension 1112 is displayed as an overlay in front of the window of the target object 1102, and not as an actual object within the window as controlled by the target object 1112 itself.

In FIG. 11*c*, the target object 1102 has been resized such that the target objects 1102, 1104, and 1106 no longer define an open graphical region (e.g., at the bottom right corner) where the UI extension 1112 could be displayed without occluding any target objects. The UI extension generator 276 evaluates the graphical properties of the resized target objects, and determines that UI extension 1112 can be displayed in the open graphical region 1116 without occluding other UI objects. Thus the UI extension generator 276 updates the size and position of the UI extension 1112 and displays it as an overlay, thus making it appear to fit within the open graphical region 1116. Although it is often desirable for the UI extension 1112 to avoid occlusion of native application UI objects, the UI extension 1112 is not limited to being within open graphical regions of native UI applications and other (e.g., arbitrary) attachments are possible. For example, a UI extension 1112 may completely or partially overlay a UI object of a native application UI. In another example, a UI extension 1112 may be presented adjacent to a window of a target UI object, such as directly below the target object 1102 at region 1120.

Figure 12:
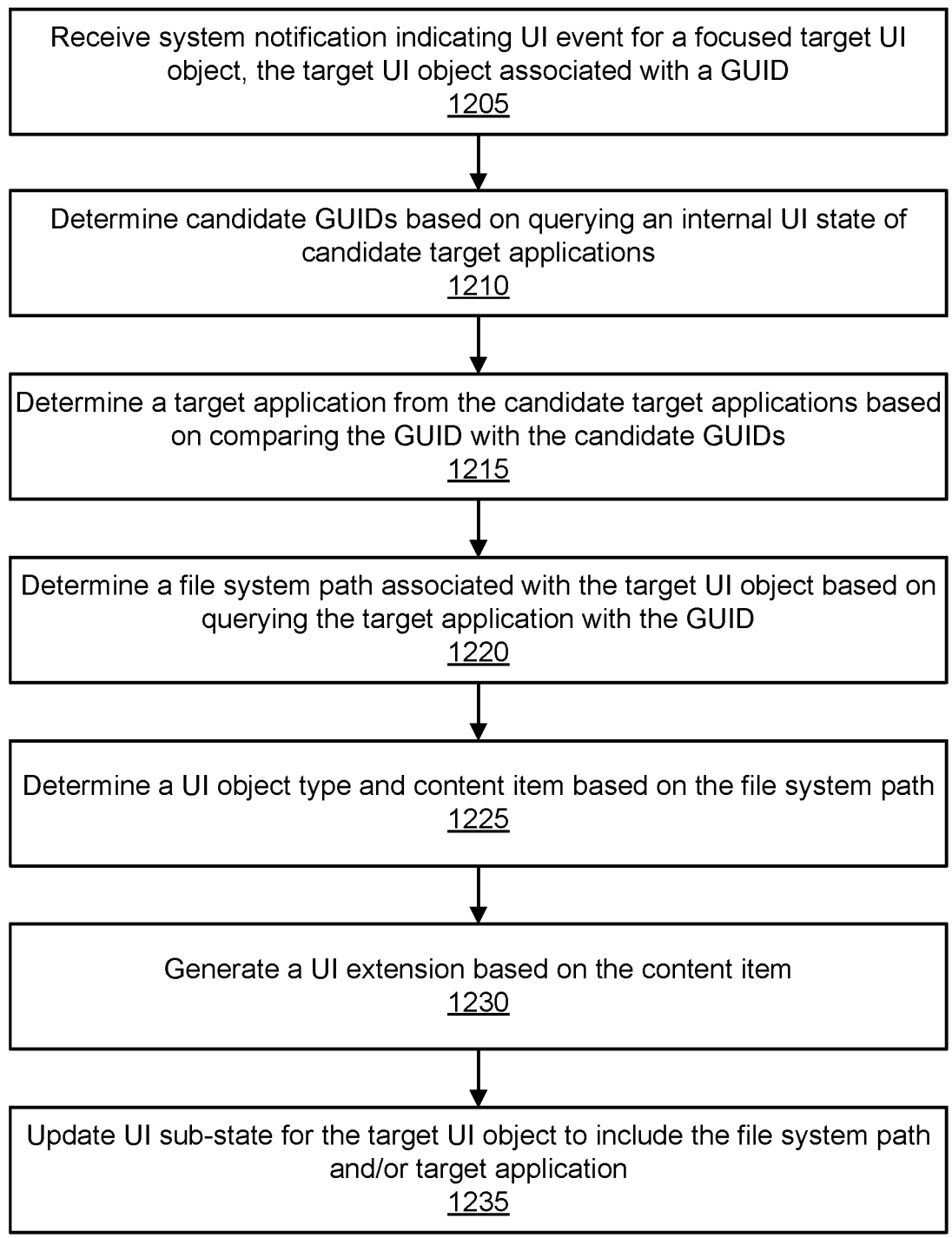
FIG. 12 shows an example process for identifying a target application, UI object type, and content item from a system notification of an event for a target UI object.

FIG. 12 shows an example process 1200 for identifying a target application, UI object type, and content item from a system notification of an event for a target UI object. As discussed above, the target UI objects of a UI sub-state 800 may include a UI object type property defining the type or class of the UI object. Some example UI object types of the UI sub-state 800 may include window object, menu object, button object, file object, or folder object types. The file UI object type may include additional parameters that identify the file, file system path, or target application.

However, in some cases, the master UI state 500 maintained by the operating system 245 may not include some or all of the UI object types of the UI sub-state 800. For example, the Windows® operating system treats all UI objects as window types. Put another way, the set of UI object node classes provided by the operating system's UI abstraction (e.g., the UI state 500) may not provide sufficiently detailed information by itself to create, from the UI state 400, a complete UI sub-state 800. As such, the UI state 400 for a window object may not include important information, such as the identity of a file represented by a UI object (or underlying file of the UI object) or the target application (e.g., a Microsoft® Word application that handles document files). In some embodiments, when the operating system 245 generates a system notification regarding the UI object, the notification does not identify any underlying file or target application. Instead, the system notification includes a GUID that identifies the target UI object.

Furthermore, in some embodiments, a portion of the data stored on the device 100 is content items managed by content management system 110. The underlying file of a target UI object can be identified in order to determine whether the underlying file is a content item managed by the content management system 110 or file that is outside of the system 110. Thus process 1200 is performed to identify a UI object type, and the type-specific properties from a system notification of a UI event for a target UI object, where only the UI object ID (or GUID) is provided from UI event notification. For a file object type, the properties may include the underlying file and/or content item.

At 1205, the UI extender module 265 receives a system notification indicating a UI event for a focused target UI object. The target UI object is assigned a GUID by the operating system 245, and this GUID is included in the system notification. In another example, the UI extender module 265 requests and receives the GUID from the operating system 245 subsequent to receiving the system notification.

In one example, the target application is a document processing application (e.g., Microsoft® Word). The focused target UI object can be a window UI object of the document processing application including an opened document file. The system notification may indicate the target UI object has become the focused target UI object. The UI extender module 265 may generate a UI extension in connection with the UI of the document processing application if the document file is a content item managed by the content management system. The target application and content item (e.g., file system path) must be determined from the GUID of the target UI object received from the system notification, even if the operating system 245 does not maintain this information as a UI object property within the UI state 400 (e.g., because the operating system 245 does not include a file object class with a file system path property).

At 1210, the UI extender module 265 determines candidate GUIDs based on querying an internal UI state 290 of candidate target applications. The candidate target applications may include a set of native applications 255, with one of the candidate target applications being the target application for the target UI object of the UI event notification.

For example, if the word processing application is a candidate target application, the word processing application may maintain an internal UI state 290 representing the UI objects of the word processing application. The candidate target application may further provide an API that can be used to query and receive UI object information from the internal UI state 290. Using this API, the UI extender module 265 requests and receives the currently focused document window, and the GUID for the UI object within the word processing application. The UI extender module 265 requests and receives the candidate GUIDs associated with each candidate target application based on querying the internal UI state of the candidate target application for the currently focused UI object.

At 1215, the UI extender module 265 determines a target application from the candidate target applications based on comparing the GUID received from the operating system 245 with the candidate GUIDs received from the candidate target applications. For example, the UI extender module 265 may match the GUID with one of the candidate GUIDs, and the candidate target application associated with the matching candidate GUID is determined as the target application.

At 1220, the UI extender module 265 determines a file system path associated with the target UI object based on querying the target application with the GUID. For example, the UI extender module 265 may use an API of a target application to query the file system path using the GUID, or by requesting the file system path associated with the currently focused UI object of the target application. The file system path may include a file system directory path and file name.

At 1225, the UI extender module 265 determines a UI object type and a content item based on the file system path. The file system path may include a directory and file name. The file name may include file type extension (e.g., .doc for document files) that is used to identify the UI object type. In another example, a folder directory without a particular file name may indicate that the UI object is a folder object type.

Content items may also be identified from the file system path. As discussed above, a content item refers to data stored by content management system 110, and can be synchronized across multiple devices 100. Furthermore, access to the content management system 110 can be integrated in the local file management system such that a file organization scheme maintained at content management system 110 is represented as a local file structure by operating system 245 in conjunction with client application 200. Objects (e.g., folders, files) of the local file structure are referenced by the file system paths, and thus content items are identified from file system paths. In some embodiments, UI extender module 265 may determine whether the file system path associated with the target UI object is a content item based on querying the content access module 206 with the file system path. The content access module 206 may include a directory of content items and their file system paths.

At 1230, the UI extender module 265 generates a UI extension based on the UI object type and content item. For example, the UI object type and type-specific properties (e.g., that identifies the file system path and whether the UI object is a content item) is stored at the UI object of the UI sub-state 800.

The UI extension can be displayed as an overlay to the UI of the target UI object. Thus the UI extension can appear to be integrated with the UI of the target application from the view of the user, but UI extender module 265 does not need to access or modify the UI of the target application, and concomitantly, the target application has no programmatic control over the UI extension. Thus, the UI extension can be arbitrarily attached to any UI in the system, such as relative to the UI of the target application, because the target application 255 or operating system 245 does not impose any restrictions on the graphical properties of the UI extension overlay.

The UI extension generated by the UI extender module 265 can provide enhanced functionality that is not provided by the target application, and which is preferably relevant to the currently focused UI object in the target application. For example, if the content item is a document file, then the UI extension may include UI objects that provide extended functionality for the document file, such as interaction with the synchronized content item at the content management system 100, or a function to share the document file with selected other users, or a function to display a version history of the document file, using the appropriate facilities of the operating system or the content management system. In that sense, the graphical or functional properties of the UI extension are updated based on a focused content item, or the properties (e.g., file type) of the focused content item.

Figure 13:
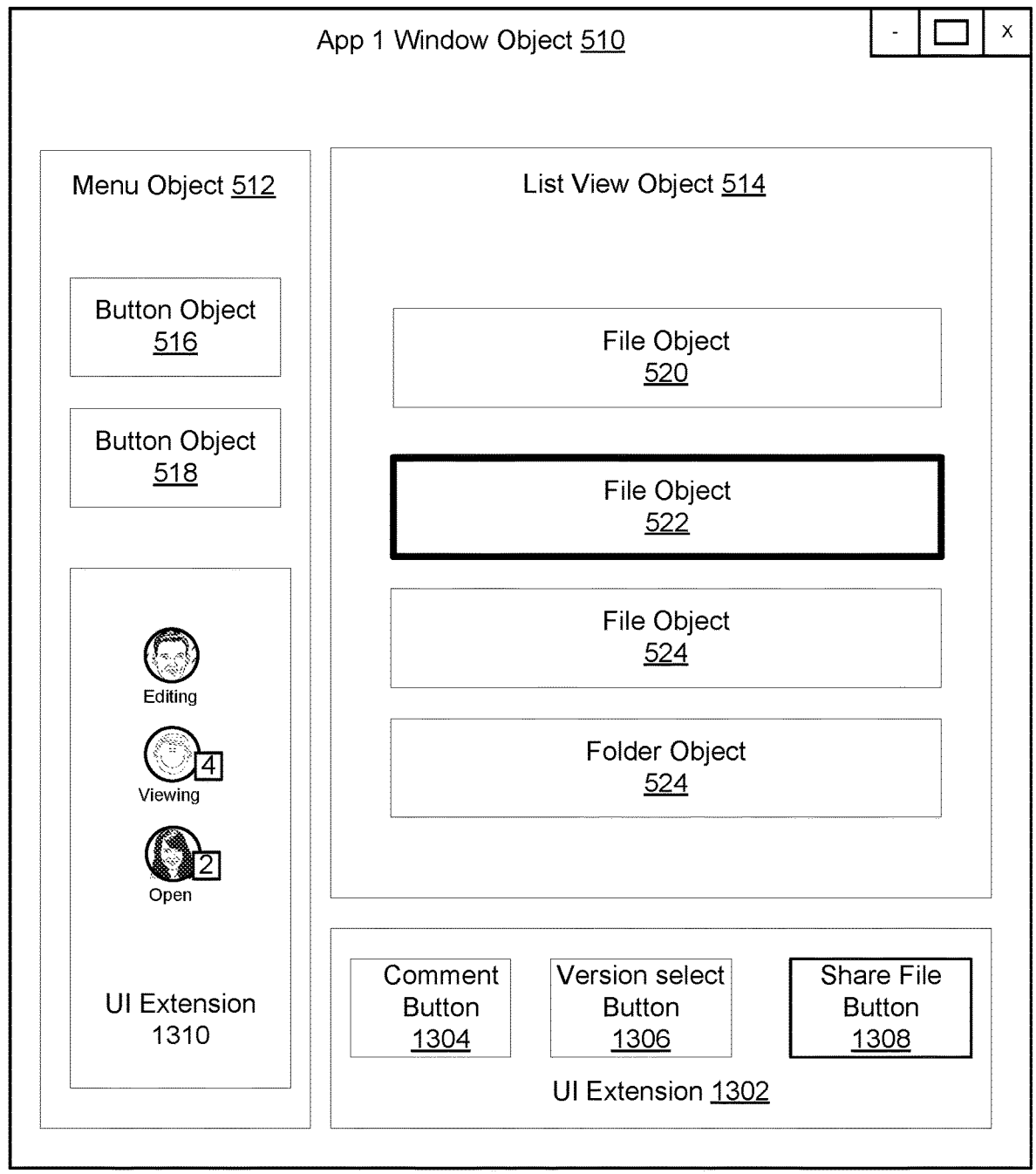
FIG. 13 shows examples of UI extensions for a focused file object.

FIG. 13 shows examples of UI extensions 1302 and 1310 for a focused file object. In response to selection or focus of the file object 522, representing a content item within a target file system browser application, a UI extension 1302 can be generated that includes button objects 1304, 1306, and 1308. The button objects 1304, 1306, and 1308 provide for interaction functionality with the content item. For example, comment button 1304 allows the user to add a comment on the content item, version selection button 1306 provides functionality that allows the user to select different versions of the content item; the share file button 1308 provides functionality allows the user to share the file with other users of the content management system.

A UI event may trigger the creation of one or more UI extensions. For example, the UI extension 1310 may also be generated in response to selection or focus of the file object 522. The UI extension 1310 provides the additional functionality of displaying interaction data identifying other users that are editing, viewing, or have opened the content item. In another example, if the focused UI object is not a content item, such as file object 524, the UI extensions 1202/1210 are not generated, or a different UI extension is generated (e.g., an add as content item button). In various implementations, functionality of UI extension 1302 and 1310 can be implemented in a single UI extension or in more than two UI extensions.

At 1235, the UI extender module 265 updates the UI sub-state 800 for the target UI object to include the file system path and target application. For example, if the target UI object is a file object, the file system path and target application is stored in association with the GUID of the target UI object. When the GUID of the target UI object is received in a subsequent system notification of an event, the UI extender module 265 may reference the file system path or target application from the UI sub-state 800 using the received GUID. In that sense, the process 1200 provides a translation function between the node classes of the master UI state 400 of the operating system 245 and node classes of the UI sub-state. In some embodiments, a pointer is mapped between a UI object of the UI state 400 and a target UI object of the UI sub-state 800. In some embodiments, steps 1210-1225 are skipped if there is an existing mapping between the UI object of the UI state 400 and a particular target UI object. Instead the mapping is used to determine the target application or content item from the GUID of the UI object. In some embodiments, different target UI object types are associated with different translation functions. For example, different UI object types are handled by different target applications with different APIs.

Figure 14:
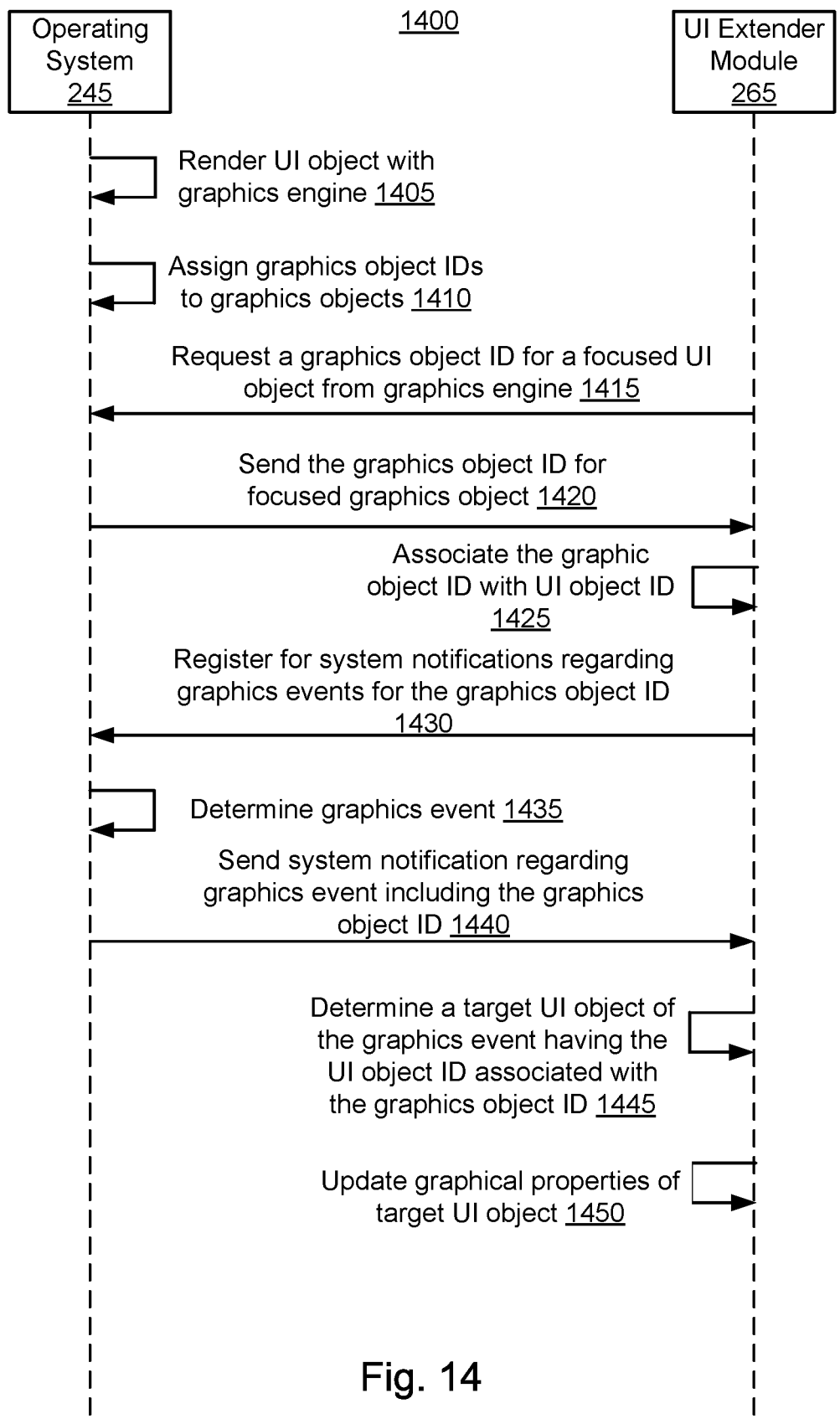
FIG. 14 shows an example process for identifying a target UI object from a system notification of a graphics event.

FIG. 14 shows an example process 1400 for identifying a target UI object from a system notification of a graphics event. The use of UI events to generate the UI sub-state 800 of a target application is described in detail above. UI events refer to events associated with changes in the UI state 400 maintained by the operating system 245, and registration for the system notifications may include communicating with the operating system 245 using the UI API 280.

However, the set of UI events provided by the API may not be sufficient to keep the UI sub-state 800 from becoming stale relative to the master UI state 400. For example, the operating system 245 may incur unacceptable system notification delays for UI events that result in UI extensions failing to be in coordination with the UI of the target application. Thus the UI sub-state 800 can become stale relative to the UI state 400 if only UI event notifications are used to update the UI sub-state 800.

Process 1400 uses system notifications from other sources of asynchronous events capable of providing UI object graphical properties. As noted above, the operating system 245 includes a graphics engine 294 that renders UI objects for display. The UI extender module 265 can communicate with the graphics engine 294 of the operating system 245 using the graphics API 292, such as the CoreGraphics API of the OS X® operating system. The graphics API 292 is used to register for and receive asynchronous system notifications regarding graphics events, and notifications regarding the graphic events are used to update the UI sub-state 800. When a graphics event (or other non-UI event) is received, a correlation between the event and the target UI object is established to ensure that the correct target UI object in the UI sub-state 800 can be identified from the system notification of the graphics event.

At 1405, the operating system 245 renders graphics objects, corresponding with UI objects of the UI state 400, with the graphics engine 294. For example, the graphics engine 294 monitors the UI state 400 maintained by the operating system to receive UI object graphics properties. The graphics engine 294 renders the graphics objects based on the UI object graphics properties. Each rendered graphics object corresponds with a UI object of the UI state 400 managed by the operating system 245.

At 1410, the operating system 245 assigns graphics object IDs to the graphics objects rendered by the graphics engine 294. Each UI object being rendered, or graphics object, is associated with a graphics object ID. The graphics object ID is a unique identifier for the graphics objects rendered by the graphics engine 294. If the graphics object ID is different from the target UI object ID (or GUID) of the associated target UI object, then the UI extender module 265 creates an association between graphics object ID and target UI object ID as discussed in greater detail below.

At 1415, the UI extender module 265 requests a graphics object ID for a focused target UI object from the graphics engine 294 of the operating system 245. At 1420, the operating system 245 sends the graphics object ID for the focused graphics object to the UI extender module 265. The communications between the UI extender module 265 and the operating system 245 regarding graphics events/objects can use the graphics API 292.

In some embodiments, the request for the graphics object ID for the target UI object is initiated when the UI extender module 265 receives a system notification of a UI even indicating that the target UI object has become the focused UI object, such as discussed above at 408 of process 800. The system notification may include a UI object ID or GUID that identifies the target UI object. In response to the UI event notification, the UI extender module 265 generates a request to the operating system 245 for graphics object ID of the focused graphics object, which corresponds with the focused target UI object.

At 1425, the UI extender module 265 associates the received graphics object ID with the UI object ID of the target UI object. The association of the graphics object ID with the UI object ID is used when the UI extender module 265 subsequently receives a system notification for a graphics event that includes the graphics object ID. The received graphics object ID is used to reference the associated target UI object, and thus the target UI object of the graphics event can be identified from graphic event notifications.

At 1430, the UI extender module 265 registers for system notifications regarding graphics events for the graphics object ID from the operating system 245. The request may include the graphics object ID previously received from the operating system 245 at 1420.

At 1435, the operating system 245 determines a graphics event. The graphics engine 294 monitors the UI state 285, and renders graphics objects based on the graphical properties of UI objects of the UI state 285. The operating system 245 may determine a graphics event when a graphics object rendering is changed, such as the height, width, or location of the graphics object.

At 1440, in response to determining the graphics event, the operating system 245 sends a system notification regarding the graphics event to the UI extender module 265. In accordance with the graphics API 292, the system notification includes the graphics object ID of the graphics object pertaining to the graphics event. The system notification may further include graphical properties of the graphics object. Graphics events can be caused when the graphical properties are different from a previous state.

At 1445, the UI extender module 265 determines a target UI object of the graphics event based on the received graphics object ID of the system notification. The UI extender module 265 may reference associations graphics object ID and UI object ID generated at 1425.

At 1450, the UI extender module 265 updates graphical properties of the target UI object for the UI sub-state 800. The graphical properties of the target UI object are updated in accordance with the graphical properties of the graphics object received with the system notification regarding the graphics event. Furthermore, the UI extender module 265 updates a UI extension based on the update to the graphical properties of the target UI object of the UI sub-state 800.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold. As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of extending a user interface (UI) of a target application displayed on a computer system, the method comprising:
   receiving a system notification from an operating system indicating a UI event associated with a UI state of the operating system, wherein the UI state indicates a target UI object related to the target application, wherein the target UI object comprises a length, width, and location;
   updating a UI sub-state for the target application based on the received system notification, wherein the UI sub-state is separate from the UI state of the operating system;
   generating a UI extension for the target UI object of the target application based on the UI sub-state, the generating of the UI extension including determining graphical properties of a UI extension object of the UI extension, the graphical properties of the UI extension object including a length, width, and location of the UI extension object; and
   causing display of the UI extension in coordination with the target UI object.

2. The method of claim 1, wherein the UI state is created by the operating system and defines graphical properties of the target UI object.

3. The method of claim 1, wherein the system notification is received after registering for system notifications related to the target UI object.

4. The method of claim 1, wherein the UI extension is generated based further on the graphical properties of the target UI object defined by the UI sub-state.

5. The method of claim 1, wherein the system notification is received via a UI API of the operating system.

6. The method of claim 1, further comprising:
   receiving a second system notification from the operating system indicating an activation event; and
   in response to receiving the second system notification:
      requesting UI objects of the target application from the operating system;
      receiving the UI objects in response to the request;
      identifying the target UI object from the received UI objects;
      adding the target UI object to the UI sub-state; and
      registering for system notifications for the target UI object.

7. The method of claim 1, further comprising:
determining one or more child UI objects of the target UI object;
determining graphical properties of the one or more child UI objects; and
determining the graphical properties of a UI extension object based on the graphical properties of the one or more child UI objects.

8. The method of claim 1, wherein causing display of the UI extension includes causing display of the UI extension over or adjacent to the target UI object.

9. The method of claim 1, wherein:
the system notification includes a global unique identifier (GUID) that identifies the target UI object; and
the method further comprises, responsive to receiving the system notification:
determining candidate GUIDs based on querying an internal UI state of candidate target applications; and
determining the target application from the candidate target applications by comparing the GUID of the system notification with the candidate GUIDs received from the candidate target applications.

10. The method of claim 9, further comprising:
determining a file system path associated with the target UI object by querying the target application with the GUID; and
identifying a UI object type for the target UI object based on the file system path.

11. The method claim 10, further comprising updating the UI sub-state for the target UI object such that the target UI object is associated with the UI object type.

12. The method of claim 9, further comprising:
determining a file system path associated with the target UI object by querying the target application with the GUID; and
identifying the target UI object as a content item of a content management system based on the file system path.

13. The method of claim 12, wherein generating the UI extension includes generating a UI extension object that provides an interface for functionality of the content management system related to the content item.

14. The method of claim 1 further comprising:
associating a graphics object ID for a graphics object rendered by the operating system with a UI object ID of the target UI object;
receiving a second system notification indicating a graphics event including the graphics object ID;
identifying the target UI object based on the graphics object ID and the associated UI object ID; and
updating graphical properties of the target UI object based on graphical properties of the graphics object.

15. The method of claim 1 further comprising maintaining a predefined number of UI sub-states, each corresponding to one of multiple target applications executing on the operating system.

16. An apparatus for extending a user interface (UI) of a target application displayed on a computer system, the apparatus comprising:
a memory and one or more processors, configured via a set of instructions to:
receive a system notification from an operating system indicating a UI event associated with a UI state of the operating system, wherein the UI state indicates a target UI object related to the target application, wherein the target UI object comprises a length, width, and location;
update a UI sub-state for the target application based on the received system notification, wherein the UI sub-state is separate from the UI state of the operating system;
generate a UI extension for the target UI object of the target application based on the UI sub-state, the generating of the UI extension including determining graphical properties of a UI extension object of the UI extension, the graphical properties of the UI extension object including a length, width, and location of the UI extension object; and
cause display of the UI extension in coordination with the target UI object.

17. The apparatus of claim 16, wherein the UI state is created by the operating system and defines graphical properties of the target UI object, wherein the system notification is received after registering for system notifications related to the target UI object, wherein the UI extension is generated based further on the graphical properties of the target UI object defined by the UI sub-state, and wherein the system notification is received via a UI API of the operating system.

18. A non-transitory computer-readable storage medium storing instructions that, when executed by a computing system, cause the computing system to perform operations for extending, on a display of a computer system, a user interface (UI) of a target application, the target application executing on an operating system of the computer system, the operations comprising:
receiving a system notification from an operating system indicating a UI event associated with a UI state of the operating system, wherein the UI state indicates a target UI object related to the target application, wherein the target UI object comprises a length, width, and location;
updating a UI sub-state for the target application based on the received system notification, wherein the UI sub-state is separate from the UI state of the operating system;
generating a UI extension for the target UI object of the target application based on the UI sub-state, the generating of the UI extension including determining graphical properties of a UI extension object of the UI extension, the graphical properties of the UI extension object including a length, width, and location of the UI extension object; and
causing display of the UI extension in coordination with the target UI object.

19. The non-transitory computer-readable storage medium of claim 16, wherein the UI state is created by the operating system and defines graphical properties of the target UI object, wherein the system notification is received after registering for system notifications related to the target UI object, wherein the UI extension is generated based further on the graphical properties of the target UI object defined by the UI sub-state, and wherein the system notification is received via a UI API of the operating system.

* * * * *

UNITED STATES PATENT AND TRADEMARK OFFICE
CERTIFICATE OF CORRECTION

PATENT NO. : 10,552,181 B2
APPLICATION NO. : 16/249614
DATED : February 4, 2020
INVENTOR(S) : Maxime Larabie-Belanger Page 1 of 1

It is certified that error appears in the above-identified patent and that said Letters Patent is hereby corrected as shown below:

In the Claims

Column 35, Line 29, Claim 11, delete "The method claim 10," and insert --The method of claim 10,--.

Signed and Sealed this
Twenty-fourth Day of March, 2020

Andrei Iancu
*Director of the United States Patent and Trademark Office*